United States Patent
Yoshino et al.

(10) Patent No.: US 9,648,311 B2
(45) Date of Patent: May 9, 2017

(54) STEREOSCOPIC DISPLAY DEVICE

(71) Applicant: Sharp Kabushiki Kaisha, Osaka-shi, Osaka (JP)

(72) Inventors: Takuto Yoshino, Osaka (JP); Takehiro Murao, Osaka (JP); Hiroshi Fukushima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 76 days.

(21) Appl. No.: 14/772,541

(22) PCT Filed: Feb. 14, 2014

(86) PCT No.: PCT/JP2014/053562
§ 371 (c)(1),
(2) Date: Sep. 3, 2015

(87) PCT Pub. No.: WO2014/141813
PCT Pub. Date: Sep. 18, 2014

(65) Prior Publication Data
US 2016/0037155 A1 Feb. 4, 2016

(30) Foreign Application Priority Data
Mar. 11, 2013 (JP) .................. 2013-047752

(51) Int. Cl.
*H04N 13/04* (2006.01)
*G02F 1/1333* (2006.01)
(Continued)

(52) U.S. Cl.
CPC ..... *H04N 13/0409* (2013.01); *G02B 27/2214* (2013.01); *G02F 1/1347* (2013.01);
(Continued)

(58) Field of Classification Search
CPC .............. H04N 13/0409; G02F 1/1347; G02B 27/2214; G02B 27/225; G09G 3/36; G09G 3/003
See application file for complete search history.

(56) References Cited

U.S. PATENT DOCUMENTS 9,240,146 B2 * 1/2016 Ohyama .................. G09G 3/36
9,497,444 B2 * 11/2016 Murao ............... G02B 27/0093
2011/0006979 A1 1/2011 Min et al.

FOREIGN PATENT DOCUMENTS

JP 2011-018049 A 1/2011
KR 10-2007-0023849 A 3/2007

* cited by examiner

*Primary Examiner* — Dung Nguyen
(74) *Attorney, Agent, or Firm* — Steven Reiss

(57) ABSTRACT

A stereoscopic display device is provided where the luminance variation encountered when the parallax barrier is switched is reduced for viewing from a wide region. The stereoscopic display device includes: a display panel that displays an image; a switch liquid crystal panel disposed to overlie the display panel and including a liquid crystal layer; a position sensor that obtains positional information about a viewer; and a control unit that receives the positional information from the position sensor and locally applies to the liquid crystal layer a first voltage for rendering the switch liquid crystal panel translucent and a second voltage for rendering the switch liquid crystal panel non-translucent to display a parallax barrier that depends on the positional information. The control unit includes a timing adjustment unit that delays a time point for switching from the lower one of the first voltage and the second voltage to the higher one relative to a time point for switching from the higher one to the lower one by a delay time that depends on the positional information.

7 Claims, 18 Drawing Sheets

(51) Int. Cl.
*G02B 27/22* (2006.01)
*G09G 3/36* (2006.01)
*G09G 3/00* (2006.01)
*G02F 1/1347* (2006.01)
*G03B 35/24* (2006.01)

(52) U.S. Cl.
CPC ............... *G09G 3/003* (2013.01); *G09G 3/36* (2013.01); *G03B 35/24* (2013.01); *G09G 2300/0426* (2013.01); *G09G 2320/0261* (2013.01); *G09G 2320/041* (2013.01); *G09G 2354/00* (2013.01); *H04N 13/0468* (2013.01); *H04N 13/0497* (2013.01)

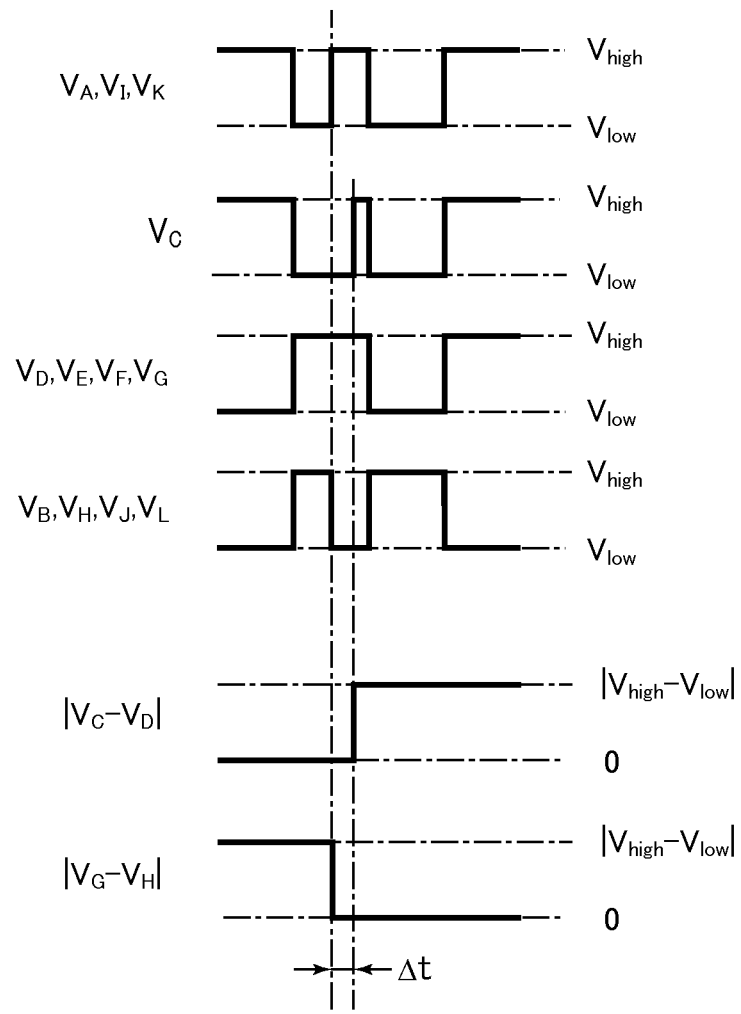

STEREOSCOPIC DISPLAY DEVICE

TECHNICAL FIELD

The present invention is related to a stereoscopic display device for naked eyes.

BACKGROUND ART

Known stereoscopic display devices that allow naked eyes to enjoy stereoscopic images include parallax barrier-based ones and lenticular lens-based ones. These stereoscopic display devices use barriers or lenses to separate light to show different images to the left and right eyes to allow the viewer to perceive depth. Currently, the main commercially-available stereoscopic display devices for naked eyes are 2-viewpoint parallax barrier-based and lenticular lens-based ones.

In the context of these 2-viewpoint stereoscopic display devices, the viewer perceives good stereoscopic imagery when he is in the designated region; however, when he moves his head to certain regions, an image to be seen by the right eye and an image to be seen by the left eye may be mixed and perceived as a double image, a phenomenon called crosstalk, or an image to be seen by the right eye may be seen by the left eye, i.e. so-called reversed-stereoscopy state. As such, the viewer can only view stereoscopic images from a limited region. To solve these problems, multi-viewpoint techniques as well as tracking techniques that detect the position of the head of the viewer and display images based on this position have been proposed.

JP 2011-18049 A describes a luminance flicker control apparatus for a wide-viewing angle stereoscopic display. This luminance flicker control apparatus includes: a video input unit mounted at a predetermined position of the display panel for capturing a real-time video of a viewer; a control unit for extracting the position and coordinates of the eyes of the viewer from the real-time video and controlling the operation of the stereoscopic video display in response to changes in the viewing angle of the viewer; and separation barrier electrodes controlled by the control unit to turn on and off to create stereoscopic video. The control unit applies a predetermined voltage to the separation barrier electrodes and adjusts the transmittance characteristics encountered when a separation barrier electrode is on to remove luminance flickering.

DISCLOSURE OF THE INVENTION

When a wide viewing angle is achieved by separation barrier electrodes, as in the wide-viewing angle stereoscopic display (i.e. stereoscopic display device) described in JP 2011-18049 A, luminance varies when the parallax barrier formed by the separation barrier electrodes is switched. The behavior of such varying luminance significantly changes depending on the direction in which the viewer views the stereoscopic display device. This makes it difficult to reduce the luminance variation encountered when the parallax barrier is switched for viewing from a wide region.

An object of the present invention is to provide a stereoscopic display device where the luminance variation encountered when the parallax barrier is switched is reduced for viewing from a wide region.

The stereoscopic display device disclosed herein includes: a display panel that displays an image; a switch liquid crystal panel disposed to overlie the display panel and including a liquid crystal layer; a position sensor that obtains positional information about a viewer; and a control unit that receives the positional information from the position sensor and locally applies to the liquid crystal layer a first voltage for rendering the switch liquid crystal panel translucent and a second voltage for rendering the switch liquid crystal panel non-translucent to display a parallax barrier that depends on the positional information. The control unit includes a timing adjustment unit that delays a time point for switching from the lower one of the first voltage and the second voltage to the higher one relative to a time point for switching from the higher one to the lower one by a delay time that depends on the positional information.

The present invention provides a stereoscopic display device where the luminance variation encountered when the parallax barrier is switched is reduced for viewing from a wide region.

BRIEF DESCRIPTION OF THE DRAWINGS

FIG. 20 is a waveform chart showing how the signals $V_A$ to $V_L$ supplied to the electrodes as well as the voltage $|V_C-V_D|$ applied to the region $R_{CD}$ and the voltage $|V_G-V_H|$ applied to the region $R_{GH}$ change over time when the panel is switched between barrier creation states.

EMBODIMENTS FOR CARRYING OUT THE INVENTION

Figure 1:
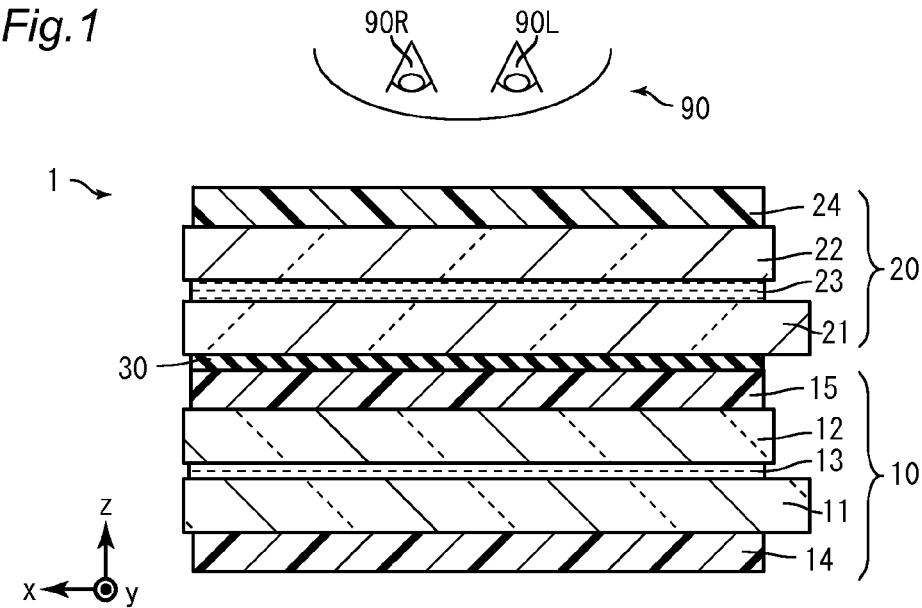
FIG. 1 is a schematic cross-sectional view of a stereoscopic display device according to a first embodiment of the present invention.

A stereoscopic display device according to an embodiment of the present invention includes: a display panel that displays an image; a switch liquid crystal panel disposed to overlie the display panel and including a liquid crystal layer; a position sensor that obtains positional information about a viewer; and a control unit that receives the positional information from the position sensor and locally applies to the liquid crystal layer a first voltage for rendering the switch liquid crystal panel translucent and a second voltage for rendering the switch liquid crystal panel non-translucent to display a parallax barrier that depends on the positional information. The control unit includes a timing adjustment unit that delays a time point for switching from the lower one of the first voltage and the second voltage to the higher one relative to a time point for switching from the higher one to the lower one by a delay time that depends on the positional information (first arrangement).

In the above arrangement, the control unit controls the voltage applied to the liquid crystal layer to create, in the switch liquid crystal panel, a parallax barrier that depends on the positional information about the viewer supplied by the position sensor.

The response speed of liquid crystal encountered when the voltage applied to a liquid crystal layer is decreased is smaller than the response speed of liquid crystal encountered when the voltage applied to the liquid crystal layer is increased. Thus, the time point at which liquid crystal is switched from the translucent state to the non-translucent state is not the same as the time point at which liquid crystal is switched from the non-translucent state to the translucent state, causing luminance variations. In the above arrangement, the control unit includes a timing adjustment unit that delays a time point for switching from the lower one of the first voltage for rendering the switch liquid crystal panel translucent and the second voltage for rendering the switch liquid crystal panel non-translucent to the higher one relative to a time point for switching from the higher one to the lower one. This will reduce luminance variations encountered when the parallax barrier is switched.

The behavior of the varying luminance produced when the parallax barrier is switched significantly changes depending on the direction in which the stereoscopic display device is viewed. Thus, even if the delay time is adjusted to reduce luminance variations encountered when the barrier is viewed in a given direction, no effect may be produced when the barrier is viewed in another direction, or luminance variations may even increase.

In the above arrangement, the timing adjustment unit adjusts the delay time depending on the positional information about the viewer supplied from the position sensor. This will reduce luminance variations encountered when the parallax barrier is switched for viewing from a wide region.

Starting from the above first arrangement, the control unit may further include a storage unit storing a table for the delay time that depends on positional relationship between the viewer and the stereoscopic display device, and the timing adjustment unit may refer to the table stored in the storage unit to decide the delay time (second arrangement).

Starting from the above first arrangement, the control unit may gradually change an absolute value of at least one of voltages applied to the liquid crystal layer (third arrangement).

Starting from first arrangement, it is preferable that a temperature sensor is further included that obtains an environmental temperature value and supplies it to the control unit, wherein the timing adjustment unit decides the delay time depending on the temperature value (fourth arrangement).

The above arrangement will reduce luminance variations encountered when the parallax barrier is switched in a wide temperature range.

Starting from first arrangement, it is preferable that the switch liquid crystal panel further includes: a first substrate and a second substrate sandwiching the liquid crystal layer and having opposite faces; a first electrode group including a plurality of electrodes provided on the first substrate and arranged with a predetermined inter-electrode distance in an arrangement direction, the arrangement direction being an in-plane direction of the first substrate; and a second electrode group including a plurality of electrodes provided on the second substrate and arranged with the inter-electrode distance in the arrangement direction, wherein the first electrode group and the second electrode group are displaced from each other in the arrangement direction, and the control unit controls a potential of the plurality of electrodes included in the first electrode group and a potential of the plurality of electrodes included in the second electrode group depending on the positional information to locally apply the first voltage and the second voltage to the liquid crystal layer (fifth arrangement).

In the above arrangement, the switch liquid crystal panel includes a first substrate having a first electrode group formed thereon and a second substrate having a second electrode group formed thereon. The first and second electrode groups each include a plurality of electrodes arranged with the same inter-electrode distance in the same arrangement direction. The control unit controls the potentials of these electrodes depending on the positional information about the viewer supplied from the position sensor to control the voltage between the first and second electrode groups. The first and second electrode groups are displaced from each other in the arrangement direction such that the voltage can be controlled more finely than on an inter-electrode distance basis.

Starting from the fifth arrangement, the control unit may drive, with a first phase, at least one of the electrodes included in one electrode group selected from the first electrode group and the second electrode group and drive the other electrodes of the first electrode group and the second electrode group with a second phase depending on the positional information, the second phase being opposite in polarity to the first phase (sixth arrangement).

Starting from first arrangement, the display panel may be a liquid crystal display panel (seventh arrangement).

EMBODIMENTS

Now, embodiments of the present invention will be described in detail with reference to the drawings. The same or corresponding components in the drawings are labeled with the same characters and their description will not be repeated. For ease of explanation, in the drawings referred to below, configurations are simplified or shown schematically, and/or some components are omitted. The size ratios between components shown in the drawings do not necessarily show their actual size ratios.

First Embodiment

Overall Configuration

FIG. 1 is a schematic cross-sectional view of a stereoscopic display device 1 according to a first embodiment of the present invention. The stereoscopic display device 1 includes a display panel 10, a switch liquid crystal panel 20, and an adhesive resin 30. The display panel 10 and switch liquid crystal panel 20 overlie each other and are attached to each other by means of the adhesive resin 30.

The display panel 10 includes a thin-film transistor (TFT) substrate 11, color filter (CF) substrate 12, a liquid crystal layer 13, and polarizers 14 and 15. The display panel 10 controls the TFT substrate 11 and CF substrate 12 to manipulate the orientation of liquid crystal molecules in the liquid crystal layer 13. The display panel 10 is illuminated with light by a backlight unit, not shown. The display panel 10 uses the liquid crystal layer 13 and polarizers 14 and 15 to adjust the amount of light transmittance on a pixel-by-pixel basis, thereby displaying an image.

The switch liquid crystal panel 20 includes a first substrate 21, a second substrate 22, a liquid crystal layer 23, and a polarizer 24. The first and second substrates 21 and 22 are located to have opposite faces. The liquid crystal layer 23 is sandwiched between the first and second substrates 21 and 22. The polarizer 24 is located on the side of the panel that is closer to a viewer 90 (i.e. the side opposite to the side adjacent the display panel 10).

Although not shown in detail in FIG. 1, the first and second substrates 21 and 22 each have a plurality of electrodes provided thereon. The switch liquid crystal panel 20 controls the potentials of these electrodes to manipulate the orientation in liquid crystal molecules of the liquid crystal layer 23, thereby changing the behavior of light passing through the liquid crystal layer 23. More specifically, the switch liquid crystal panel 20 uses the orientation of liquid crystal molecules in the liquid crystal layer 23 and the working of the polarizer 24 to create a parallax barrier including regions that block light from the display panel 10 (i.e. barriers) and regions that pass light from the display panel 10 (i.e. slits). The detail of the structures of the first and second substrates 21 and 22 and their operation will be described further below.

The thickness of the TFT substrate 11 and CF substrate 12 may be 200 µm, for example. The thickness of the polarizer 14 may be 137 µm, for example. The thickness of the polarizer 15 may be 170 µm, for example. The thickness of the first and second substrates 21 and 22 may be 225 µm, for example. The thickness of the adhesive resin 30 may be 50 µm, for example.

Alternatively, the polarizer 15 may be located on the switch liquid crystal panel 20. More specifically, the polarizer 15 may be located on the side of the first substrate 21 of the switch liquid crystal panel 20 that is adjacent the display panel 10, and the adhesive resin 30 may be located between the polarizer 15 and CF substrate 12.

The direction of a line segment that connects the left eye 90L and right eye 90R of the viewer 90 when the viewer 90 directly faces the stereoscopic display device 1 (i.e. the x-direction of FIG. 1) will be hereinafter referred to as horizontal direction. The direction perpendicular to the horizontal direction in the plane of the display panel 10 (i.e. the y-direction of FIG. 1) will be referred to as vertical direction.

Figure 2:
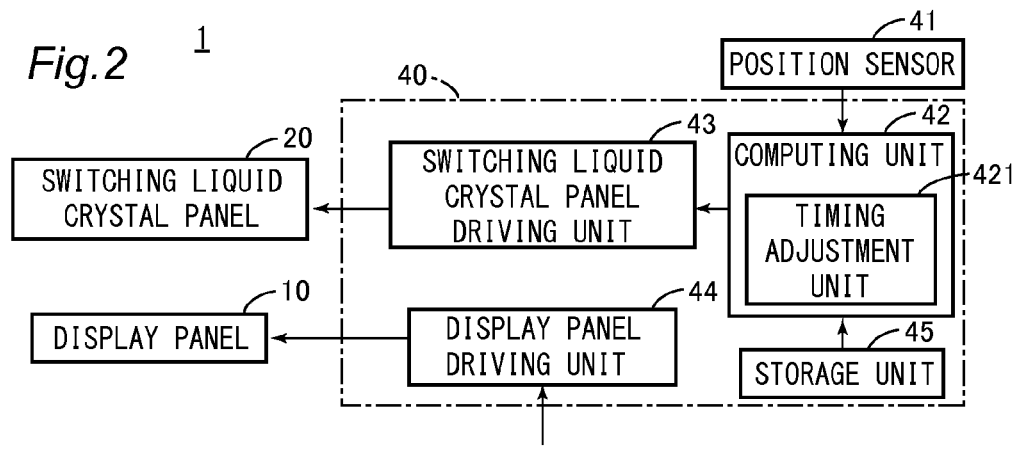
FIG. 2 is a functional block diagram of the stereoscopic display device according to the first embodiment of the present invention.
Figure 3:
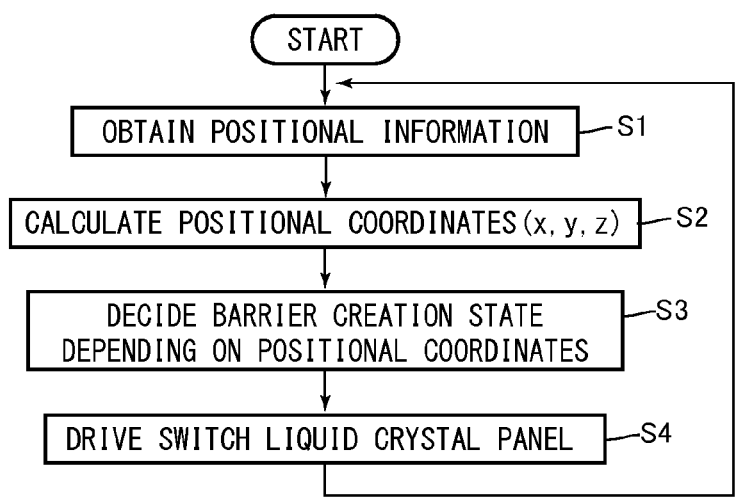
FIG. 3 is a flow chart of a process by the stereoscopic display device according to the first embodiment of the present invention.

FIG. 2 is a functional block diagram of the stereoscopic display device 1. FIG. 3 is a flow chart of a process by the stereoscopic display device 1. The stereoscopic display device 1 includes a control unit 40 and a position sensor 41. The control unit 40 includes a computing unit 42, a switch liquid crystal panel driving unit 43, a display panel driving unit 44 and a storage unit 45.

The display panel driving unit 44 drives the display panel 10 based on video signals supplied from outside to display an image on the display panel 10.

The position sensor 41 obtains position information about the viewer 90 (step S1). The position sensor 41 may be a camera or an infrared sensor, for example. The position sensor 41 supplies the obtained positional information to the computing unit 42 of the control unit 40.

The computing unit 42 analyzes the positional information about the viewer 90 supplied from the position sensor 41 to calculate the positional coordinates (x,y,z) for the viewer 90 (step S2). The positional coordinates may be calculated by an eye tracking system that uses image processing to detect the positions of the eyes of the viewer 90, for example. Alternatively, the positional coordinates may be calculated by a head tracking system that uses infrared rays to detect the position of the head of the viewer 90.

Further, the computing unit 42 decides the barrier creation state of the switch liquid crystal panel 20 depending on the positional coordinates for the viewer 90 (step S3). That is, it decides the positions of the barriers and the positions of the slits in the switch liquid crystal panel 20 depending on the positional coordinates for the viewer 90.

The computing unit 42 includes a timing adjustment unit 421. The timing adjustment unit 421 refers to the storage unit 45 to adjust the timing for switching between barrier creation states. The storage unit 45 stores a table of switching time points that are dependent on the positional relationship between the viewer 90 and the stereoscopic display device 1. The timing for switching between barrier creation states, as well as the table stored in the storage unit 45, will be described in detail further below.

The computing unit 42 supplies the information for the barrier creation state that has been decided on in the above manner to the switch liquid crystal panel driving unit 43.

The switch liquid crystal panel driving unit 43 drives the switch liquid crystal panel 20 based on the information supplied from the computing unit 42 (step S4). Then, steps S1 to S4 are repeated.

The principles of stereoscopy achieved by the stereoscopic display device 1 will be described below with reference to FIGS. 4A to 4C and FIGS. 5A to 5C.

Figure 4A:
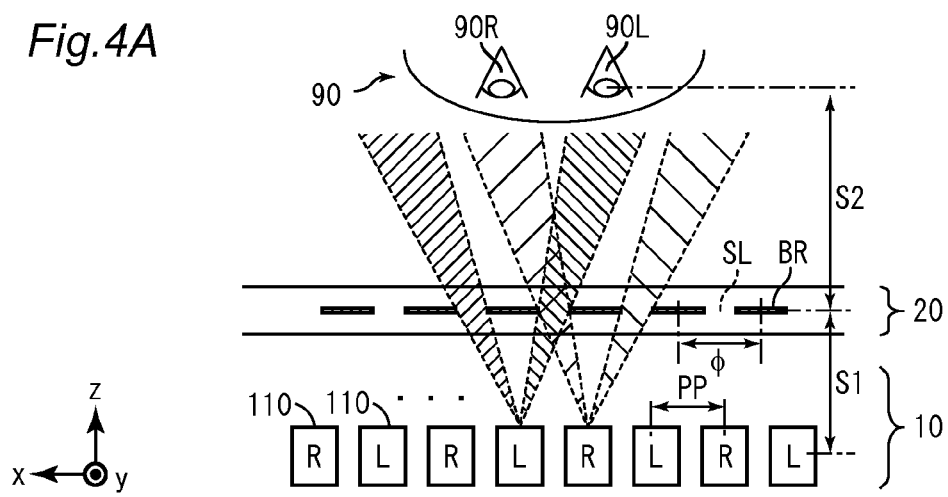
FIG. 4A illustrates the principles of stereoscopy achieved by the stereoscopic display device according to the first embodiment of the present invention.

First, an implementation with a fixed barrier creation state will be described with reference to FIGS. 4A to 4C. The display panel 10 includes a plurality of pixels 110. Right eye images (R) and left eye images (L) are displayed on the pixels 110 alternately as measured in the horizontal direction. In the switch liquid crystal panel 20, barriers BR that block light from the display panel 10 and slits SL that pass light from the display panel 10 are formed with a predetermined distance. Thus, as shown in FIG. 4A, only right eye images (R) are seen by the right eye 90R of the viewer 90, while only left eye images (L) are seen by the left eye 90L. This allows the viewer 90 to perceive depth (normal region).

The distance PP between pixels 110 and the distance φ between barriers BR satisfy φ=2×PP×(S2)/(S1+S2), where S1 is the distance between the display plane of the display panel 10 and the barriers BR, and S2 is the distance between the barriers BR and viewer 90. If S2>>S1, φ≈2×PP.

Figure 4B:
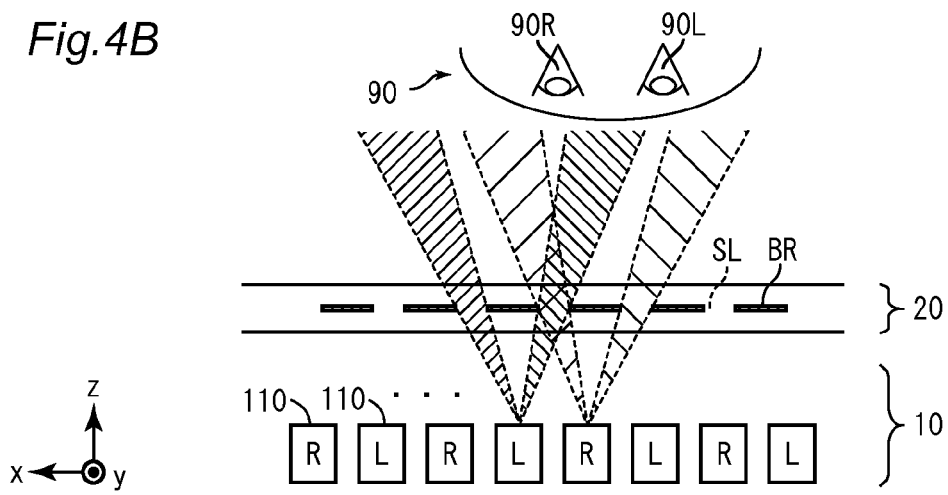
FIG. 4B illustrates the principles of stereoscopy achieved by the stereoscopic display device according to the first embodiment of the present invention.

FIG. 4B shows the viewer 90 moved horizontally from his position in FIG. 4A. In this case, both right eye images (R) and left eye images (L) are seen by the right eye 90R of the viewer 90. Similarly, both right eye images (R) and left eye images (L) are seed by the left eye 90L. In this case, the viewer 90 cannot perceive depth (crosstalk region).

Figure 4C:
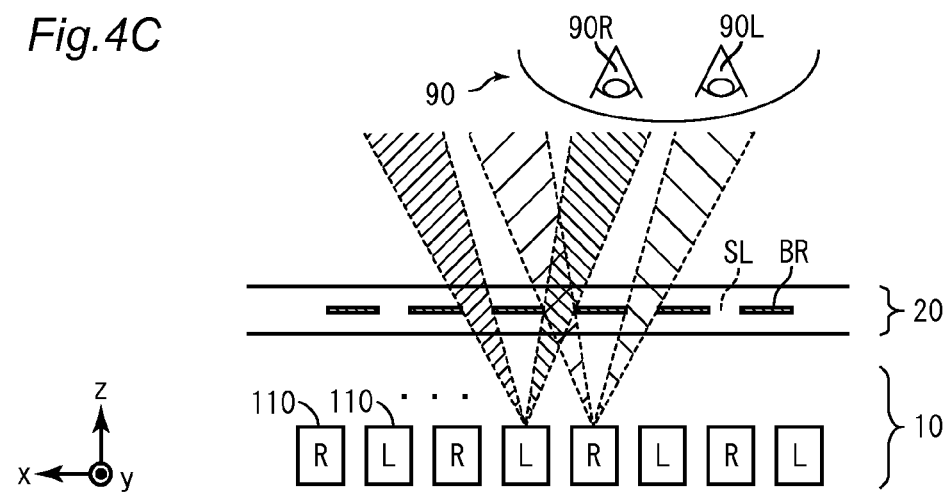
FIG. 4C illustrates the principles of stereoscopy achieved by the stereoscopic display device according to the first embodiment of the present invention.

FIG. 4C shows the viewer 90 moved horizontally from his position in FIG. 4B. In this case, left eye images (L) are seen by the right eye 90R of the viewer 90, while right eye images (R) are seen by the left eye 90L. In this case, too, the viewer 90 cannot perceive depth (reversed-stereoscopy region).

Thus, as the viewer 90 moves, a normal region, a crosstalk region and a reversed-stereoscopy region appear repeatedly. Thus, with a fixed barrier creation state, the viewer 90 can only perceive depth from limited regions.

Figure 5A:
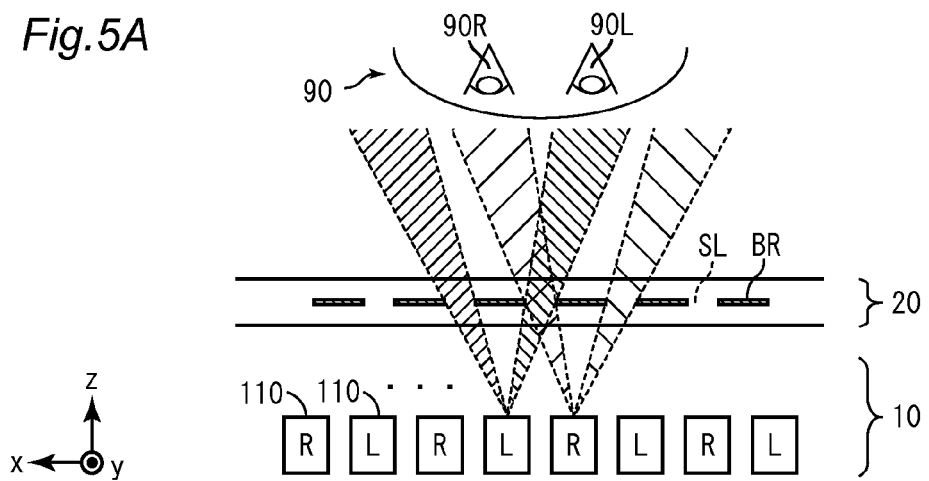
FIG. 5A illustrates the principles of stereoscopy achieved by the stereoscopic display device according to the first embodiment of the present invention.
Figure 5B:
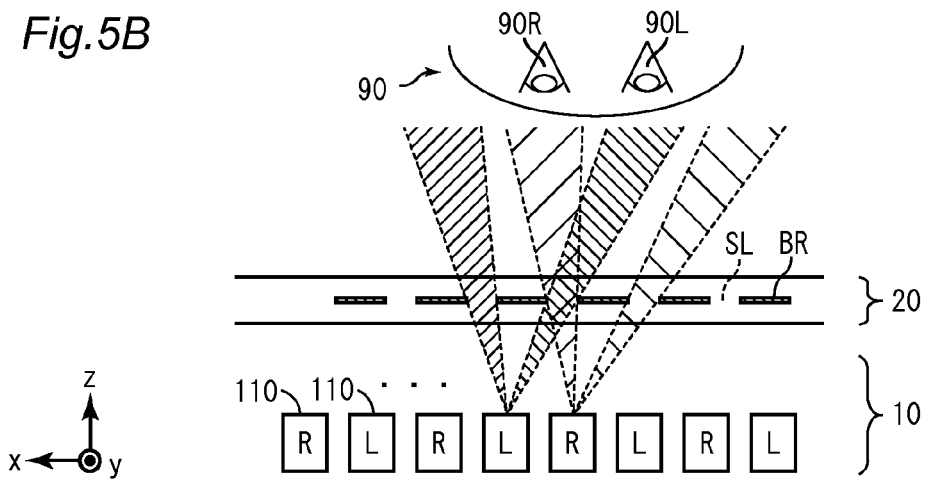
FIG. 5B illustrates the principles of stereoscopy achieved by the stereoscopic display device according to the first embodiment of the present invention.
Figure 5C:
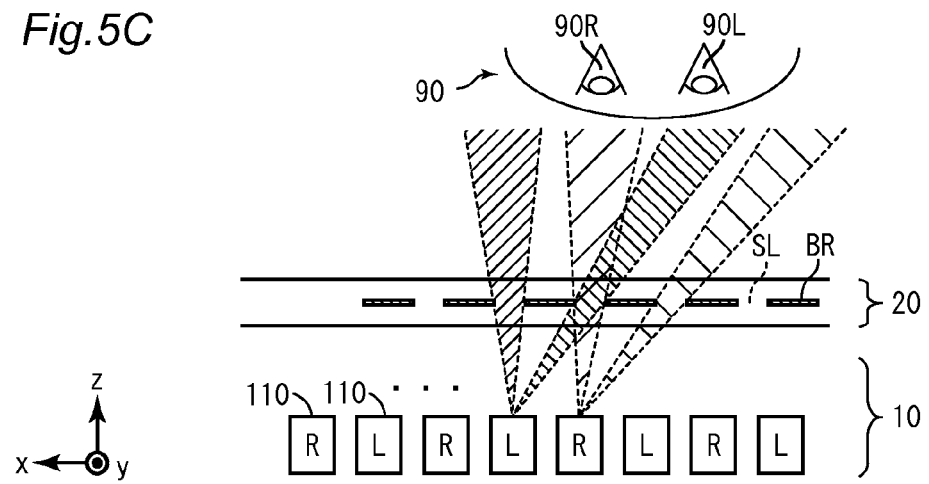
FIG. 5C illustrates the principles of stereoscopy achieved by the stereoscopic display device according to the first embodiment of the present invention.

According to the present embodiment, as shown in FIGS. 5A to 5C, the control unit 40 changes the barrier creation state of the switch liquid crystal panel 20 depending on the positional information (i.e. positional coordinates) about the viewer 90. Thus, the viewer is always in a normal region, and no crosstalk region or reversed-stereoscopy region exists.

Configuration of Switch Liquid Crystal Panel 20

Figure 6A:
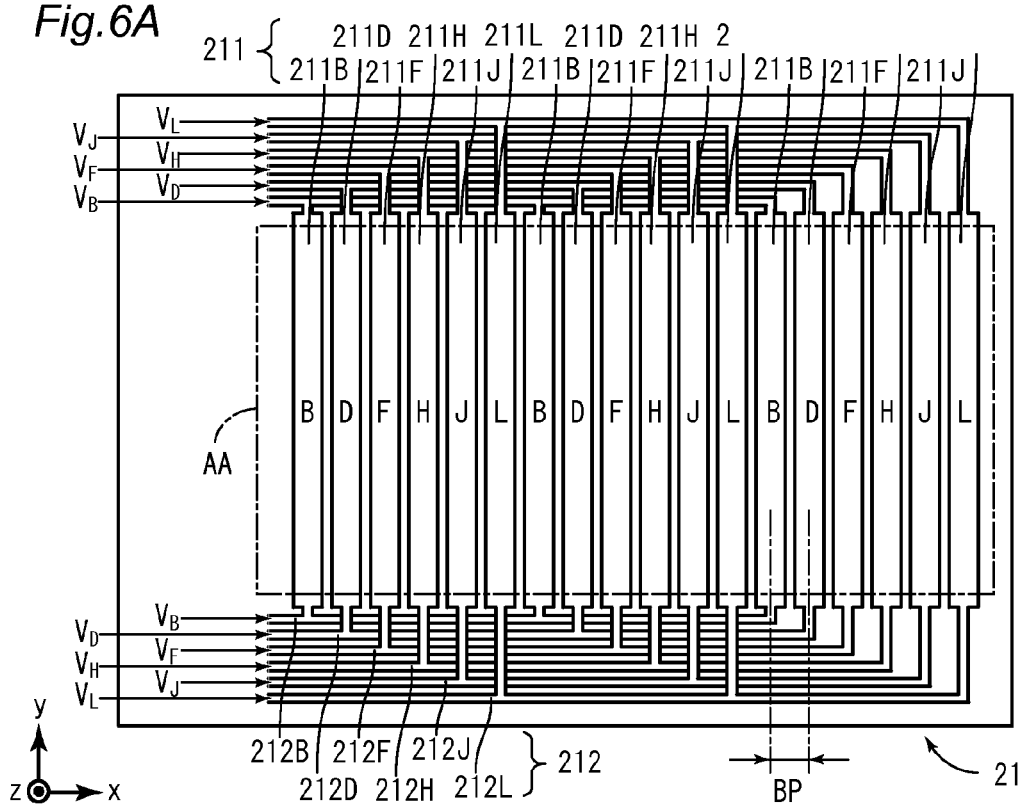
FIG. 6A is a plan view of a first substrate of the switch liquid crystal panel.

FIG. 6A is a plan view of the first substrate 21 of the switch liquid crystal panel 20. The first substrate 21 has a first electrode group 211 provided thereon. The first electrode group 211 includes a plurality of electrodes arranged in the x-direction with the inter-electrode distance BP. The electrodes extend in the y-direction and are disposed parallel to each other.

The first substrate 21 further has a line group 212 provided thereon that are electrically connected with the first electrode group 211. The line group 212 is preferably located outside the region of the substrate that overlaps the display region of the display panel 10 when the switch liquid crystal panel 20 is placed to overlie the display panel 10 (i.e. active area (AA)).

Six types of signals $V_B$, $V_D$, $V_F$, $V_H$, $V_J$, and $V_L$ are supplied to the first electrode group 211 from the control unit 40 via the line group 212. The electrodes of the first electrode group 211 to which the signals $V_B$, $V_D$, $V_F$, $V_H$, $V_J$, and $V_L$ are supplied will be hereinafter referred to as electrodes 211B, 211D, 211F, 211H, 211J and 211L. The lines electrically connected with the electrodes 211B, 211D, 211F, 211H, 211J and 211L will be referred to as lines 212B, 212D, 212F, 212H, 212J and 212L.

The electrodes 211B, 211D, 211F, 211H, 211J and 211L are arranged periodically in the x-direction in this order. That is, for a given electrode, the same signal as that for this electrode is supplied to the one that is located six electrodes away from that electrode.

Figure 6B:
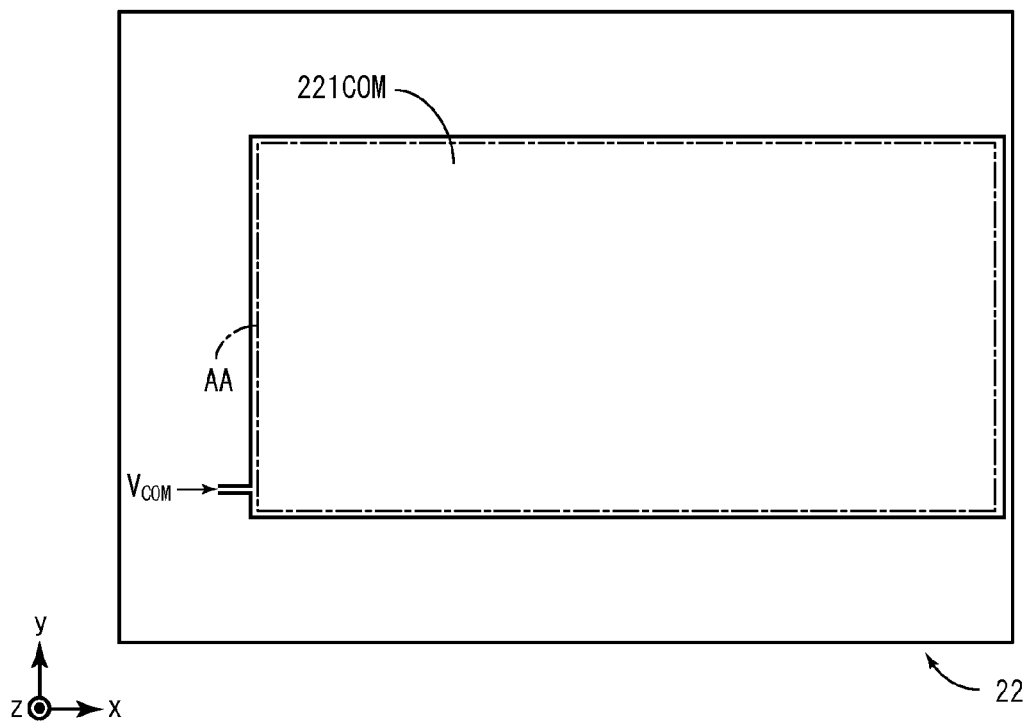
FIG. 6B is a plan view of a second substrate of the switch liquid crystal panel.

FIG. 6B is a plan view of the second substrate 22 of the switch liquid crystal panel 20. A common electrode 221COM is provided on the second substrate 22 to cover generally the entire active area AA. A signal $V_{COM}$ is supplied to the common electrode 221COM from the control unit 40.

Figure 7:
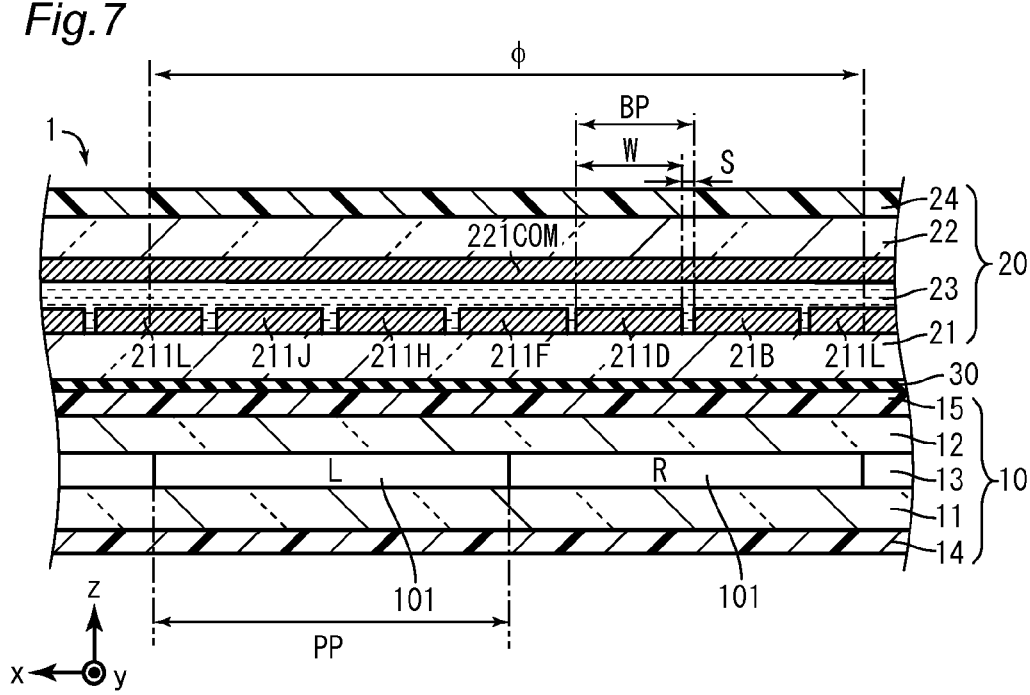
FIG. 7 is a schematic cross-sectional view of the stereoscopic display device according to the first embodiment of the present invention.

FIG. 7 is a schematic cross-sectional view of the stereoscopic display device 1. The inter-electrode distance BP is the sum of the width W of an electrode and the gap S between two adjacent electrodes. In the present embodiment, BP=φ/6≈PP/3. Specific examples of values may be PP=80.7 μm, BP=26.87 μm, W=22.87 μm, and S=4 μm.

Although not shown in FIG. 7, an oriented film is provided on each of the first and second substrates 21 and 22.

The oriented films provided on the first and second substrates 21 and 22 are rubbed in directions that cross each other. Thus, the orientation of the liquid crystal molecules in the liquid crystal layer 23 is rotated as it goes from the first substrate 21 toward the second substrate 22 when no voltage is applied, that is, the molecules are in a so-called twisted nematic orientation.

The polarizers 15 and 24 are disposed so that their light transmission axes are perpendicular to each other. That is, the switch liquid crystal panel 20 of the present embodiment has the maximum transmittance when no voltage is applied to the liquid crystal layer 23, that is, the panel has a so-called normally white liquid crystal. However, this arrangement is merely an example, and the switch liquid crystal panel 20 may have a so-called normally black liquid crystal.

A specific example configuration of the first substrate 21 and a method of manufacturing it will be described below with reference to FIGS. 8A to 8C.

Figure 8A:
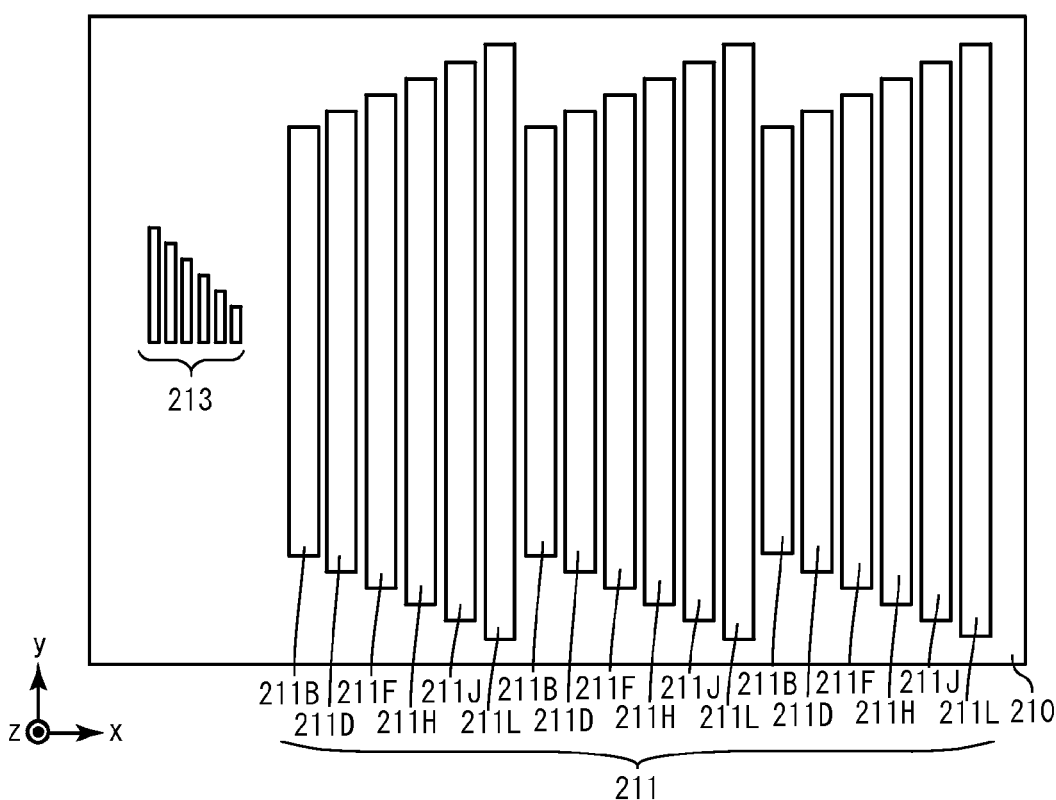
FIG. 8A illustrates an example of a method of manufacturing the first substrate.

First, as shown in FIG. 8A, on a substrate 210 is formed a first electrode group 211 and relay electrodes 213. The relay electrodes 213 are provided to relay to a line group 212 that will be formed in a later step. The substrate 210 is a translucent and electrically insulating substrate, and may be a glass substrate, for example. The first electrode group 211 and relay electrodes 213 are preferably translucent, and may be made of indium therein oxide (ITO), for example. The first electrode group 211 and relay electrodes 213 are formed by sputtering or chemical vapor deposition (CVD), for example, and may be photolithographically patterned.

Figure 8B:
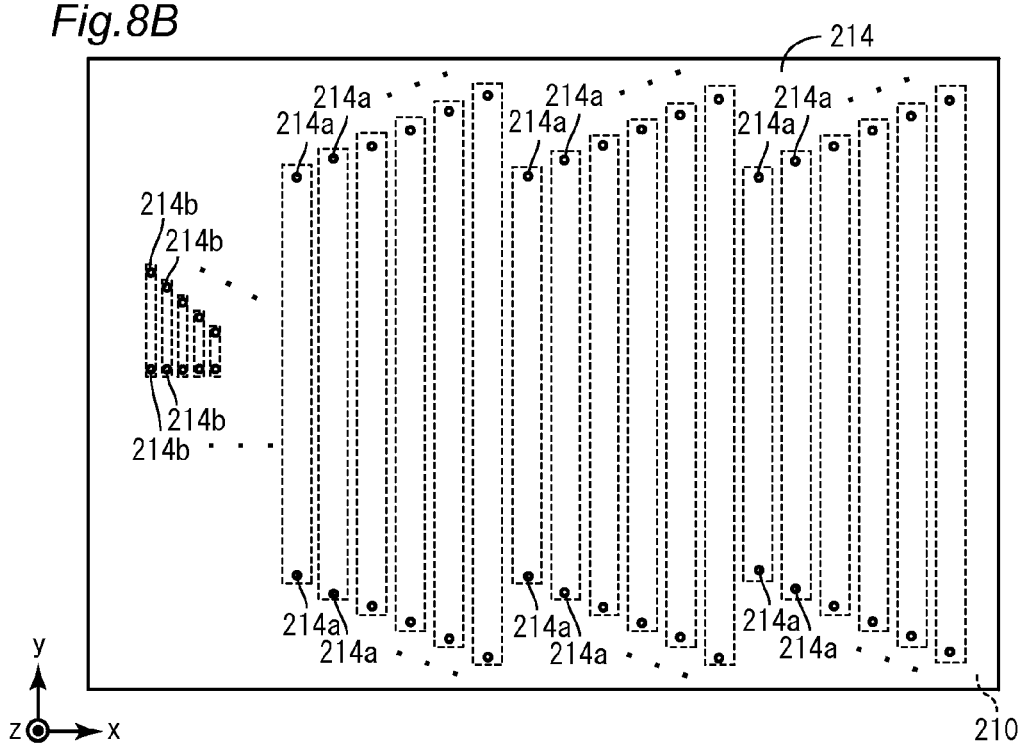
FIG. 8B illustrates the example of the method of manufacturing the first substrate.

Next, as shown in FIG. 8B, an insulating film 214 is formed to cover the substrate 210, first electrode group 211 and relay electrodes 213. Contact holes 214a and 214b are formed in the insulating film 214. The contact holes 214a are located to connect the first electrode group 211 to the line group 212 which will be formed in the next step. The contact holes 214b are located to connect the relay electrodes 213 to the line groups 212.

The insulating film 214 is preferably translucent, and may be made of SiN, for example. The insulating film 214 may be formed by CVD, for example, and the contact holes 214a and 214b are photolithographically formed therein. If the line group 212 is located outside the active area, the insulating film 214 may be patterned such that it is present only outside the active area.

Figure 8C:
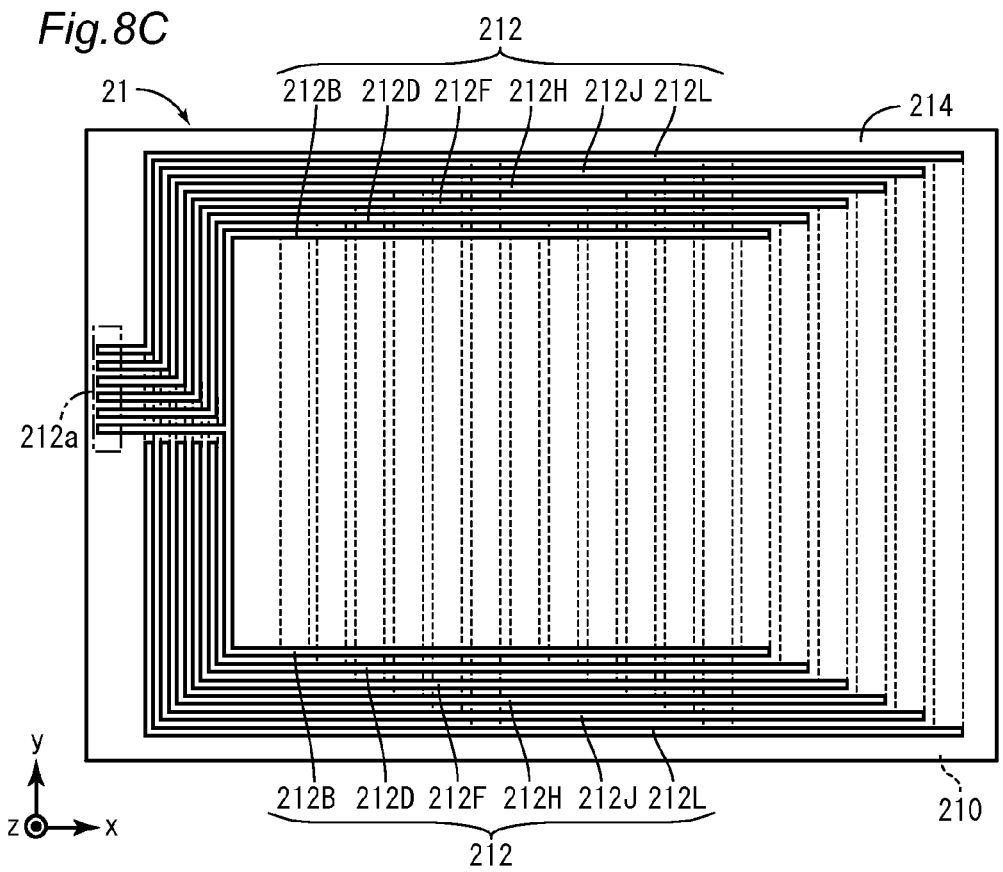
FIG. 8C illustrates the example of the method of manufacturing the first substrate.

Next, as shown in FIG. 8C, the line group 212 is formed. The line group 212 is connected to the first electrode group 211 via the contact holes 214a, and connected to the relay electrodes 213 via the contact holes 214b. The line group 212 is preferably highly conductive, and may be made of aluminum, for example. The line group 212 may be made of ITO. The line group 212 may be formed by sputtering, for example, and photographically patterned.

As discussed above, the lines 212B, 212D, 212F, 212H, 212J, and 212L are connected with the electrodes 211B, 211D, 211F, 211H, 211J and 211L, respectively. The triple-layer construction with the first electrode group 211, insulating layer 214 and line group 212 allows the first electrode group 211 and line group 212 to cross each other in plan view.

In the implementation shown in FIG. 8C, an end of the line group 212 is gathered near the periphery of the substrate 21 to form a terminal assembly 212a. A flexible printed circuit (FPC) or the like is connected with the terminal assembly 212a.

In the implementation shown in FIG. 8C, a line is connected to each of the ends of each electrode of the electrode group 211 disposed in the y-direction. The pair of lines that are connected with the ends of each electrode of the electrode group 211 disposed in the y-direction are connected with each other via a relay electrode 213. A signal is applied to both ends of each electrode of the electrode group 211 disposed in the y-direction to minimize differences in potential in the electrode.

The second substrate 22 may be provided by forming a common electrode 221COM on a translucent and electrically insulating substrate, for example. The common electrode 221COM may be provided by forming ITO by CVD, for example.

[How to Drive Switch Liquid Crystal Panel 20]

How to drive the switch liquid crystal panel 20 will be described below with reference to FIGS. 9A and 9B, FIGS. 10A and 10B, and FIG. 11.

Figure 9A:
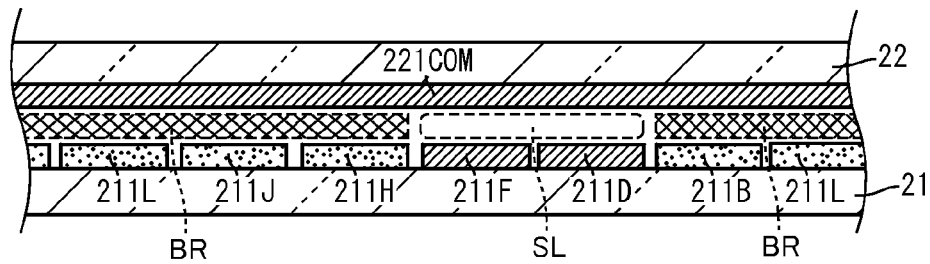
FIG. 9A is a schematic cross-sectional view of the switch liquid crystal panel showing one barrier creation state.
Figure 9B:
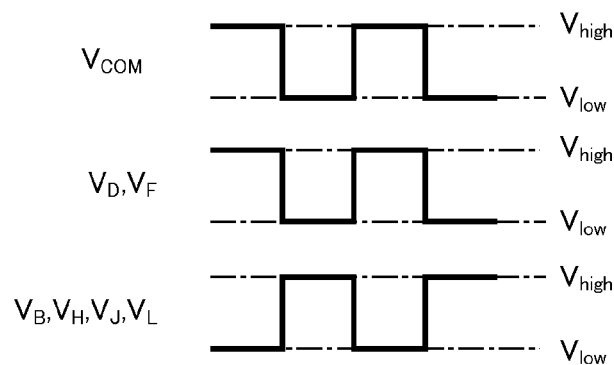
FIG. 9B is a waveform chart of signals $V_{COM}$, $V_B$, $V_D$, $V_F$, $V_J$, $V_H$, and $V_L$ supplied to the electrodes to put the switch liquid crystal panel in the barrier creation state of FIG. 9A.

FIG. 9A is a schematic cross-sectional view of one of the barrier creation states of the switch liquid crystal panel 20. FIG. 9B is a waveform chart of signals $V_{COM}$, $V_B$, $V_D$, $V_F$, $V_J$, $V_H$, and $V_L$ supplied to the electrodes to put the switch liquid crystal panel 20 in the barrier creation state of FIG. 9A.

The control unit 40 drives the common electrode 221COM, electrode 211D and electrode 211F with one and the same phase, and drives the other electrodes with a phase that is opposite in polarity. In FIG. 9A, the electrodes that are driven with the phase opposite in polarity to that of the common electrode 221COM are schematically indicated by a random-dot pattern. The same applies to FIG. 10A.

In the implementation shown in FIG. 9B, the control unit 40 applies a rectangular AC voltage with one polarity to the common electrode 221COM, electrode 211D and electrode 211F, and applies a rectangular AC voltage with the opposite polarity to the other electrodes.

As shown in FIG. 9B, the signals $V_{COM}$, $V_B$, $V_D$, $V_F$, $V_J$, $V_H$, and $V_L$ preferably all have the same amplitude. In the example shown in FIG. 9B, each of the signals $V_{COM}$, $V_B$, $V_D$, $V_F$, $V_J$, $V_H$, and $V_L$ is at a predetermined high potential ($V_{high}$, for example 5V) or a predetermined low potential ($V_{low}$, for example 0V).

This creates a difference in potential of $|V_{high}-V_{low}|$ between the common electrode 221COM and electrode 211B such that liquid crystal molecules in the liquid crystal layer 23 located between the common electrode 221COM and electrode 211B are oriented in the z-direction. As discussed above, the switch liquid crystal panel 20 has a normally white liquid crystal. Thus, a barrier BR is created in the region where the common electrode 221COM overlaps the electrode 211B in plan view (i.e. in xy-plan view).

Similarly, barriers BR are created in the regions where, in plan view, the common electrode 221COM overlaps the electrode 211H, the common electrode 221COM overlaps the electrode 211J, and the common electrode 221COM overlaps the electrode 211L.

On the other hand, no difference in potential is produced between the common electrode 221COM and electrodes 211D and 211F. As discussed above, the switch liquid crystal panel 20 has a normally white liquid crystal. Thus, slits SL are created in the regions where the common electrode 221COM overlap the electrodes 211D and 211F in plan view.

Figure 10A:
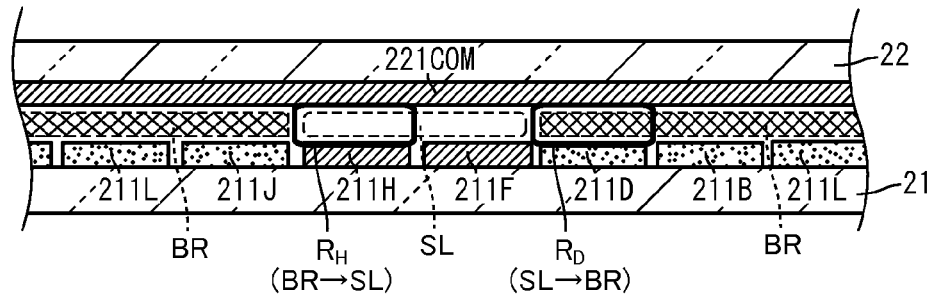
FIG. 10A is a schematic cross-sectional view of the switch liquid crystal panel showing another barrier creation state.
Figure 10B:
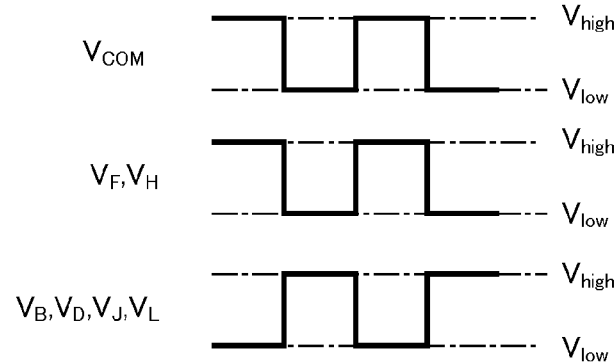
FIG. 10B is a waveform chart of signals $V_{COM}$, $V_B$, $V_D$, $V_F$, $V_J$, $V_H$, and $V_L$ supplied to the electrodes to put the switch liquid crystal panel in the barrier creation state of FIG. 10A.

FIG. 10A is a schematic cross-sectional view of another barrier creation state of the switch liquid crystal panel 20. FIG. 10B is a waveform chart of signals $V_{COM}$, $V_B$, $V_D$, $V_F$, $V_J$, $V_H$, and $V_L$ supplied to the electrodes to put the switch liquid crystal panel 20 in the barrier creation state of FIG. 10A.

In the example shown in FIG. 10B, the control unit 40 applies a rectangular AC voltage with one polarity to the common electrode 221COM, electrode 211F and electrode 211H, and applies a rectangular AC voltage with the opposite polarity to the other electrodes.

Thus, barriers BR are created in the regions where the common electrode overlaps the electrodes 221B, 221D, 221J and 221L in plan view, and slits SL are created in the regions where it overlaps the electrodes 221F and 221H in plan view.

Referring to FIGS. 9A and 10A, the present embodiment allows the positions of the barriers BR and slits SL to move on an inter-electrode distance BP basis.

When the panel is switched from the barrier creation state of FIG. 9A to that of FIG. 10A, the barrier creation state of the region where the common electrode overlaps the electrode 211D in plan view (i.e. region $R_D$) switches from a slit SL to a barrier BR. On the other hand, the barrier creation state of the region where the common electrode overlaps the electrode 211H in plan view (i.e. region $R_H$) switches from a barrier BR to a slit SL.

The response speed of liquid crystal encountered when the voltage applied to the liquid crystal layer 23 decreases is smaller than that encountered when the voltage applied to the liquid crystal layer 23 increases, because the response speed of liquid crystal encountered when the applied voltage decreases depends on the physical properties of the liquid crystal and is difficult to control. Thus, the time required for liquid crystal to switch from a barrier BR to a slit SL is longer than the time required for the liquid crystal to switch from a slit SL to a barrier BR.

As such, in the process in which the panel is switched from the barrier creation state of FIG. 9A to that of FIG. 10A, the total area of the barriers BR is larger than those for the barrier creation states of FIGS. 9A and 10A. Thus, when the panel is switched between barrier creation states, luminance variations occur.

In the present embodiment, the timing adjustment unit 421 delays the time point at which the voltage applied to the liquid crystal layer 23 is increased relative to the time point at which the voltage applied to the liquid crystal layer 23 is decreased. More specifically, the time point at which the region $R_D$ is switched from a slit SL to a barrier BR is delayed relative to the time point at which the region $R_H$ is switched from a barrier BR to a slit SL. Further, the timing adjustment unit 421 adjusts the time by which a time point is delayed depending on the position of the viewer 90, as discussed below.

Figure 11:
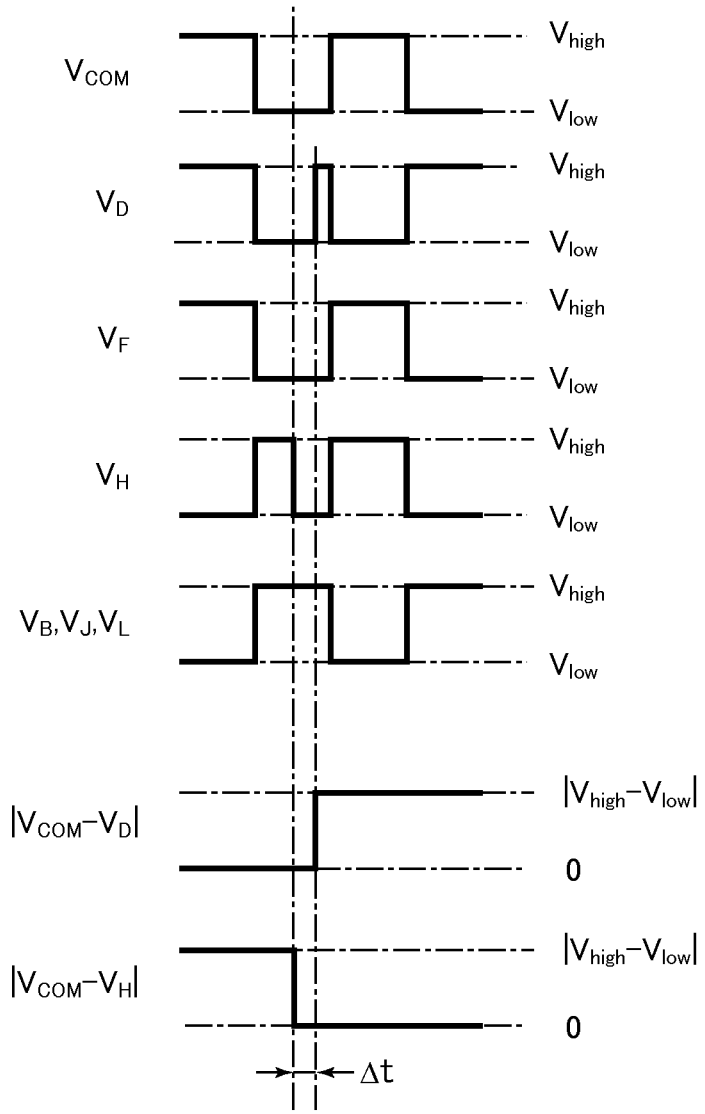
FIG. 11 is a waveform chart showing how the signals $V_{COM}$, $V_B$, $V_D$, $V_F$, $V_J$, $V_H$, and $V_L$ supplied to the electrodes as well as the voltage $|V_{COM}-V_D|$ applied to the region $R_D$ and the voltage $|V_{COM}-V_H|$ applied to the region $R_H$ change over time when the panel is switched between barrier creation states.

FIG. 11 is a waveform chart showing how the signals $V_{COM}$, $V_B$, $V_D$, $V_F$, $V_J$, $V_H$, and $V_L$ supplied to the electrodes as well as the voltage $|V_{COM}-V_D|$ applied to the region $R_D$ and the voltage $|V_{COM}-V_H|$ applied to the region $R_H$ change over time when the panel is switched between barrier creation states.

In the implementation shown in FIG. 11, a time point at which the signal $V_D$ is reversed to switch between barrier creation states is delayed by a delay time $\Delta t$ relative to a time point at which the signal $V_H$ is reversed. Thus, the time point at which the voltage is applied to the region $R_D$ is delayed by the delay time $\Delta t$ relative to the time point at which the voltage is removed from the region $R_H$.

Figure 12:
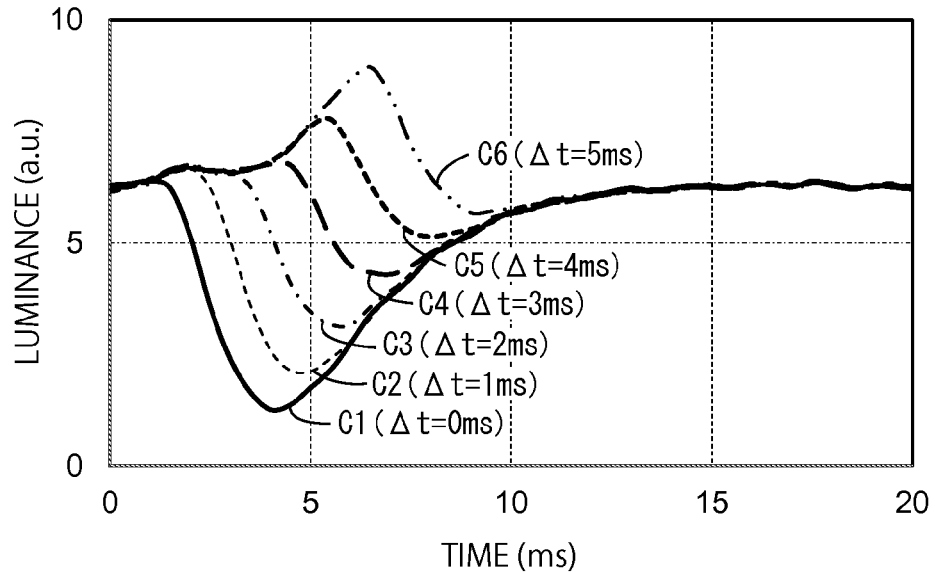
FIG. 12 is a graph showing how luminance changes over time when the panel is switched between barrier creation states for different delay times $\Delta t$ in connection with one example arrangement of the stereoscopic display device.

FIG. 12 is a graph showing how luminance changes over time when the panel is switched between barrier creation states for different delay times $\Delta t$ in connection with one example arrangement of the stereoscopic display device 1. Curves C1, C2, C3, . . . , and C6 indicate how luminance changes over time for the delay time $\Delta t$ of 0 ms, the delay time $\Delta t$ of 1 ms, the delay time $\Delta t$ of 2 ms, . . . , and the delay time $\Delta t$ of 5 ms, respectively. FIG. 12 shows the luminance viewed in the direction normal to the display plane (i.e. z-direction).

As shown in FIG. 12, in this example arrangement, the delay times $\Delta t$ of 3 to 4 ms minimize the amount of luminance variance (i.e. the difference between the highest luminance and the lowest luminance).

Figure 13A:
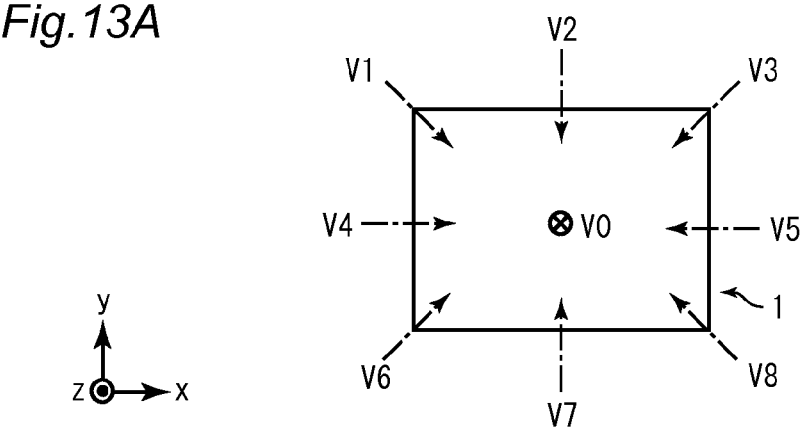
FIG. 13A illustrates viewing directions V0 to V8.
Figure 13B:
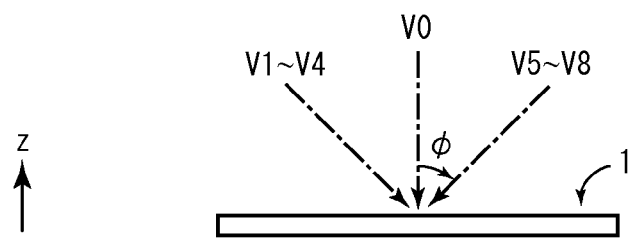
FIG. 13B illustrates viewing directions V0 to V8.
Figure 14A:
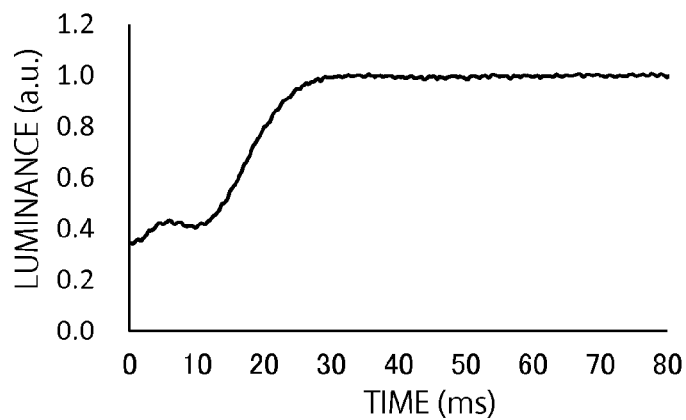
FIG. 14A shows how the luminance of the stereoscopic display device as viewed in direction V0 changes over time.
Figure 14B:
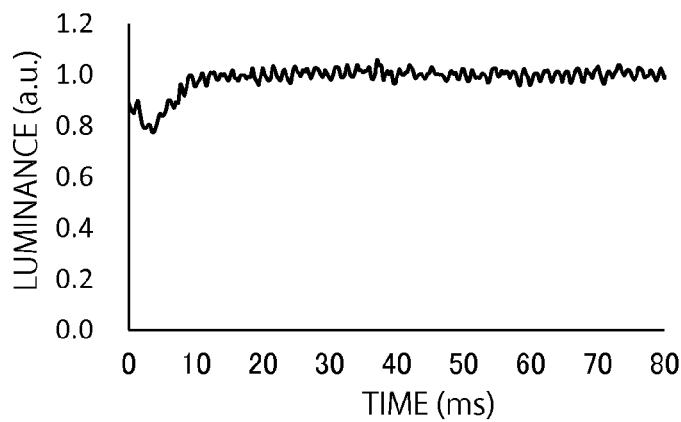
FIG. 14B shows how the luminance of the stereoscopic display device as viewed in direction V1 changes over time.
Figure 14C:
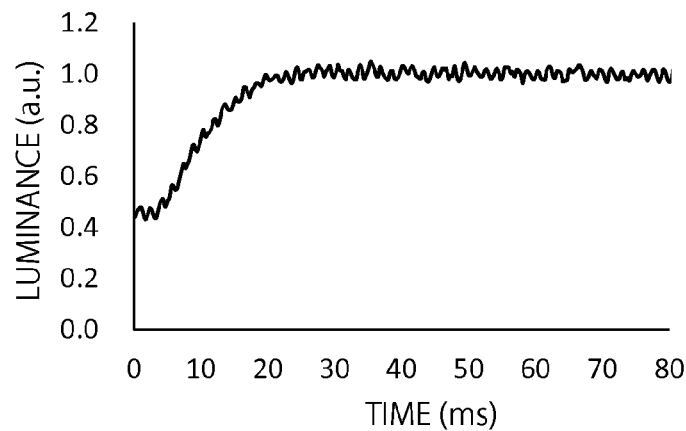
FIG. 14C shows how the luminance of the stereoscopic display device as viewed in direction V2 changes over time.
Figure 14D:
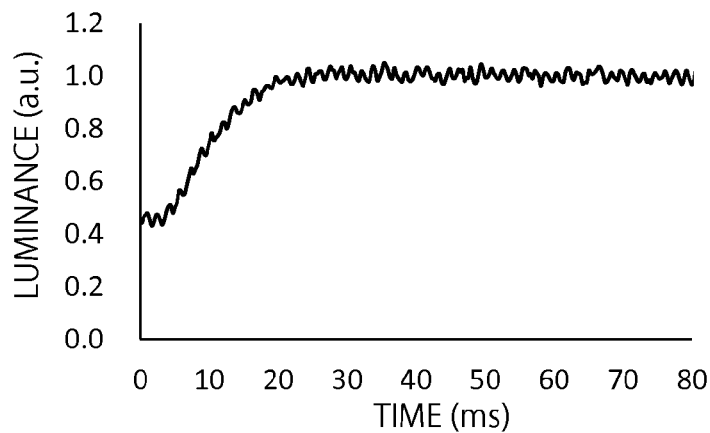
FIG. 14D shows how the luminance of the stereoscopic display device as viewed in direction V3 changes over time.
Figure 14E:
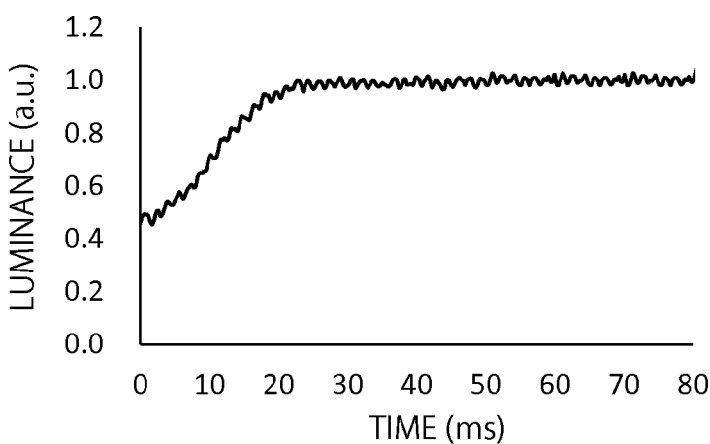
FIG. 14E shows how the luminance of the stereoscopic display device as viewed in direction V4 changes over time.
Figure 14F:
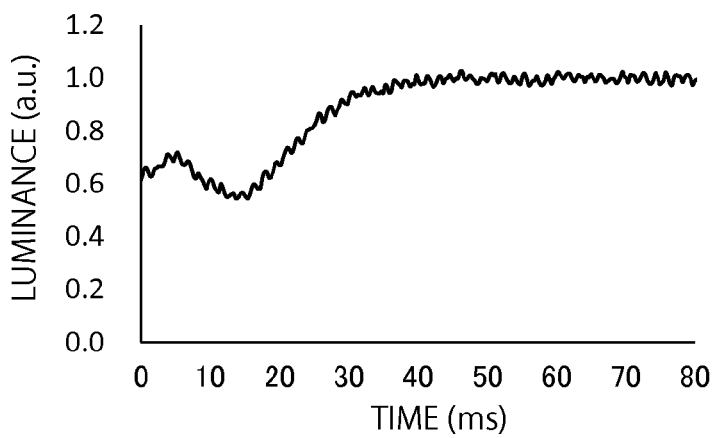
FIG. 14F shows how the luminance of the stereoscopic display device as viewed in direction V5 changes over time.
Figure 14G:
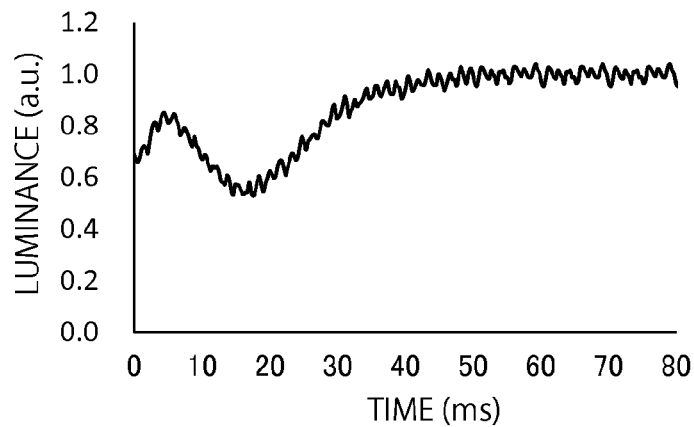
FIG. 14G shows how the luminance of the stereoscopic display device as viewed in direction V6 changes over time.
Figure 14H:
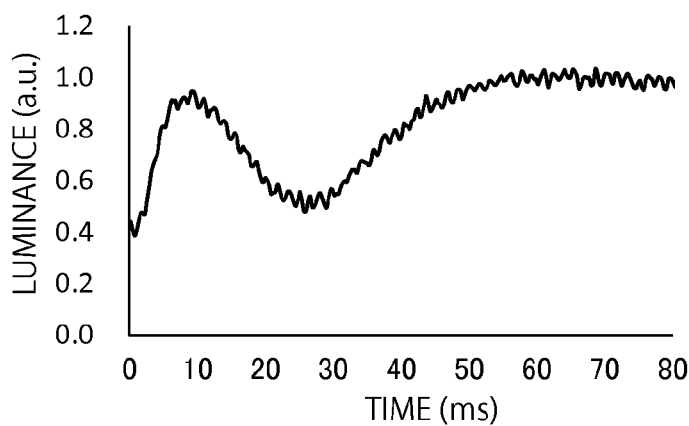
FIG. 14H shows how the luminance of the stereoscopic display device as viewed in direction V7 changes over time.
Figure 14I:
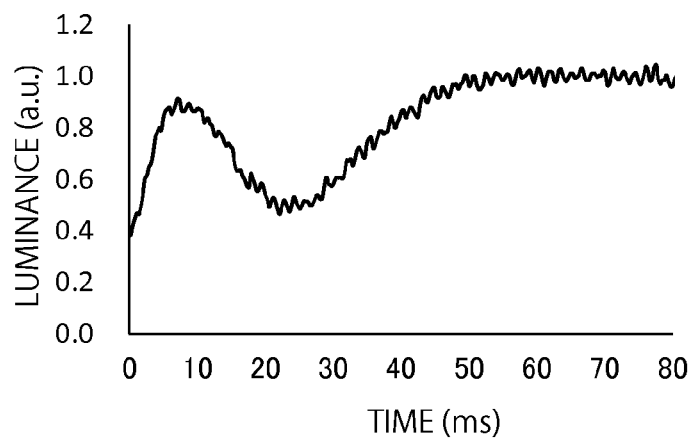
FIG. 14I shows how the luminance of the stereoscopic display device as viewed in direction V8 changes over time.

On the other hand, the behavior of the varying luminance produced when liquid crystal switches between barrier creation states significantly changes depending on the direction in which the stereoscopic display device 1 is viewed. FIGS. 13A and 13B illustrate viewing directions V0 to V8. FIG. 14A, FIG. 14B, FIG. 14C, . . . , FIG. 14I show how the luminance of the stereoscopic display device 1 viewed in direction V0, direction V1, direction V2, . . . , direction V8 changes over time.

Viewing direction V0 is the direction normal to the display plane of the stereoscopic display device 1 (i.e. z-direction). Viewing directions V1 to V8 are a direction inclined from the normal direction toward the display plane by $\phi=45°$ and directions rotated from this direction around the normal direction by a multiple of 45°.

FIG. 14A to FIG. 14I were obtained as follows: all the pixels 110 of the display panel 10 were caused to display white; barriers BR and slits SL were displayed alternately on the switch liquid crystal panel 20 with a predetermined distance (3D display); then, at a certain time, the entire switch liquid crystal panel 20 was caused to produce slits SL (2D display); at this moment, how the luminance of the stereoscopic display device 1 changed over times was observed in directions V0 to V8.

Thus, the behavior of the varying luminance produced when liquid crystal switches between barrier creation states significantly changes depending on the direction in which the stereoscopic display device 1 is viewed. Thus, even if the delay time $\Delta t$ is decided to reduce luminance variations encountered when the barrier is viewed in the normal direction, no effect may be produced when the barrier is viewed in another direction, or luminance variations may even increase.

The present embodiment adjusts the delay time $\Delta t$ depending on the positional information about the viewer 90.

For example, the timing adjustment unit 421 converts the positional coordinates (x,y,z) of the viewer 90 to polar coordinates (r,θ,φ). The storage unit 45 stores a table $\Delta t(\theta,\phi)$ of display times $\Delta t$ that are dependent on the directional components θ and φ of polar coordinates. The timing adjustment unit 421 refers to the storage unit 45 to decide on a delay time $\Delta t$.

Alternatively, the timing adjustment unit 421 may not refer to the storage unit 45, but may decide on a delay time $\Delta t$ as a function of the positional coordinates (x,y,z) by calculation.

The stereoscopic display device 1 according to the first embodiment of the present invention has been described. According to the present embodiment, luminance variances produced when the panel is switched between barrier creation states are reduced for viewing from a wide region.

The present embodiment describes an implementation with a first electrode group 211 composed of 6 types of electrodes. This configuration is merely an example, and it is only required that the number of types of electrodes constituting the first electrode group 211 be 2 or more. That is, as long as the first electrode group 211 includes two or more electrodes whose potential can be controlled independently, the same effects as those of the present embodiment will be obtained.

Second Embodiment

Figure 15:
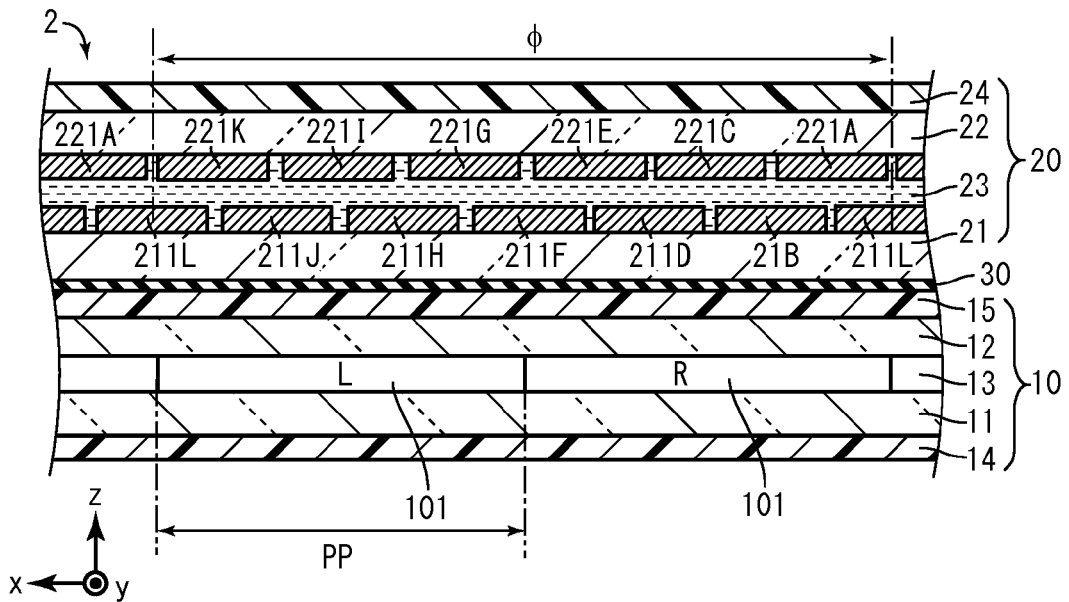
FIG. 15 is a schematic cross-sectional view of the stereoscopic display device according to a second embodiment of the present invention.

FIG. 15 is a schematic cross-sectional view of a stereoscopic display device 2 according to a second embodiment of the present invention. The stereoscopic display device 2 is different from the stereoscopic display device 1 in the configuration of the second substrate 22 of the switch liquid crystal panel 20.

Figure 16:
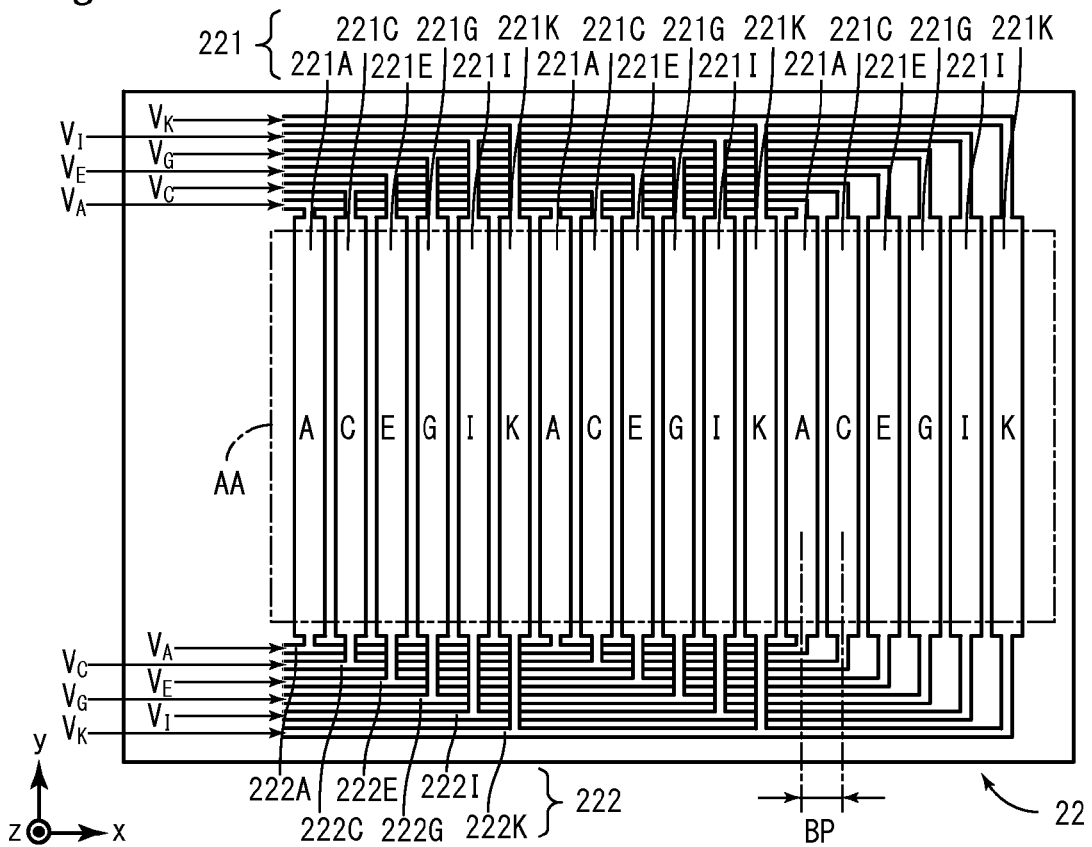
FIG. 16 is a plan view of a second substrate of the switch liquid crystal panel of the stereoscopic display device according to the second embodiment of the present invention.

FIG. 16 is a plan view of the second substrate 22 of the switch liquid crystal panel 20 of the stereoscopic display device 2. Instead of the common electrode 221COM, a second electrode group 221 is provided on the second substrate 22. The second electrode group 221 includes a plurality of electrodes arranged in the x-direction with an inter-electrode distance BP. The electrodes extend in the y-direction and are disposed parallel to each other.

Furthermore, a line group 222 is provided on the second substrate 22 to be electrically connected with the second electrode group 221. The line group 222 is preferably located outside the active area AA.

Six types of signals $V_A$, $V_C$, $V_E$, $V_G$, $V_I$, and $V_K$ are supplied to the second electrode group 221 from the control unit 40 via the line group 222. Similar to the electrodes of the first electrode group 211, the electrodes to which the signals $V_A$, $V_C$, $V_E$, $V_G$, $V_I$, and $V_K$ are supplied will be referred to as electrodes 221A, 221C, 221E, 221G, 221I and 221K, respectively. The lines electrically connected with the electrodes 221A, 221C, 221E, 221G, 221I and 221K will be referred to as lines 222A, 222C, 222E, 222G, 222I and 222K.

Similar to the electrodes of the first electrode group 211, the electrodes 221A, 221C, 221E, 221G, 221I and 221K are arranged periodically in the x-direction in this order.

The second substrate 22 can be manufactured in a similar manner as the first substrate 21, described with reference to FIGS. 8A to 8C.

Figure 17:
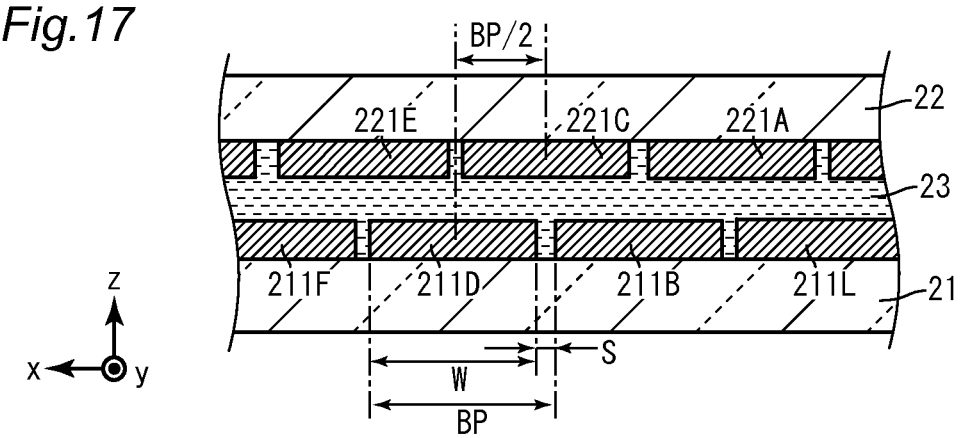
FIG. 17 is an enlarged view of a part of the switch liquid crystal panel of the stereoscopic display device according to the second embodiment of the present invention.

FIG. 17 is an enlarged cross-sectional view of a part of the switch liquid crystal panel 20 of the stereoscopic display device 2. As shown in FIG. 17, the first electrode group 211 is displaced from the second electrode group 221 in the x-direction. Preferably, the first electrode group 211 is displaced from the second electrode group 221 by a half of the inter-electrode distance BP in the x-direction, as in the implementation of FIG. 17.

How to drive the switch liquid crystal panel 20 will be described below with reference to FIGS. 18A and 18B and FIGS. 19A and 19B.

Figure 18A:
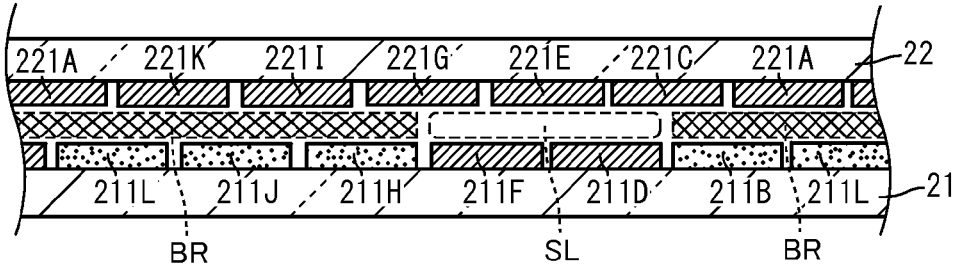
FIG. 18A is a schematic cross-sectional view of the switch liquid crystal panel showing one barrier creation state.
Figure 18B:
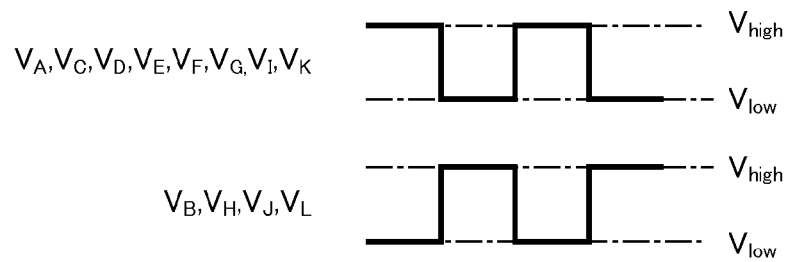
FIG. 18B is a waveform chart of signals $V_A$ to $V_L$ supplied to the electrodes to put the switch liquid crystal panel in the barrier creation state of FIG. 18A.

FIG. 18A is a schematic cross-sectional view of the switch liquid crystal panel 20 showing one barrier creation state. FIG. 18B is a waveform chart of signals $V_A$ to $V_L$ supplied to the electrodes to put the switch liquid crystal panel 20 in the barrier creation state of FIG. 18A.

The control unit 40 drives, with a first phase, some electrodes included in one electrode group selected from the first electrode group 211 and second electrode group 221, and drives the other electrodes with a second phase that is opposite to the first phase in polarity. In FIG. 18A, the electrodes driven with the first phase are schematically indicated by a random-dot pattern. The same applies to FIG. 19A.

In the example shown in FIGS. 18A and 18B, the control unit 40 applies a rectangular AC voltage to the electrodes, where the first phase is applied to the electrodes 211B, 211H, 211J and 211L included in the first electrode group 211 and the second phase is applied to the other electrodes (i.e. electrodes 211D and 211F and electrodes 221A to 221K).

As shown in FIG. 18B, the signals $V_A$ to $V_L$ preferably all have the same amplitude. In the example shown in FIG. 18B, each of the signals $V_A$ to $V_L$ is in a predetermined high potential ($V_{high}$, for example 5V) or a predetermined low potential ($V_{low}$, for example 0V).

This creates a difference in potential of $|V_{high}-V_{low}|$ between the electrode 221A and electrode 211B such that liquid crystal molecules in the liquid crystal layer 23 located between the electrode 221A and electrode 211B are oriented in the z-direction. As discussed above, the switch liquid crystal panel 20 has a normally white liquid crystal. Thus, a barrier BR is created in the region where the electrode 221A overlaps the electrode 211B in plan view (i.e. in xy-plan view).

Similarly, barriers BR are created in the regions where, in plan view, the electrode 211B overlaps the electrode 221C, the electrode 221G overlaps the electrode 211H, the electrode 211H overlaps the electrode 221I, the electrode 221I overlaps the electrode 211J, the electrode 211J overlaps the electrode 221K, the electrode 221K overlaps the electrode 211L, and the electrode 211L overlaps the electrode 221A.

On the other hand, no difference in potential is produced between the electrode 221C and electrode 211D. As discussed above, the switch liquid crystal panel 20 is a normally white liquid crystal. Thus, a slit SL is created in the region where the electrode 221C overlaps the electrode 211D in plan view.

Similarly, slits SL are created in the regions where, in plan view, the electrode 211D overlaps the electrode 221E, the electrode 221E overlaps the electrode 211F and electrode 211F overlaps the electrode 221G.

As a result, barriers BR are created in the regions where the second electrode group overlaps the electrodes 211B, 211H, 211J and 211L driven with the first phase in plan view, while slits SL are created in the regions where the second electrode group overlaps the electrodes 211D and 211F in plan view.

Figure 19A:
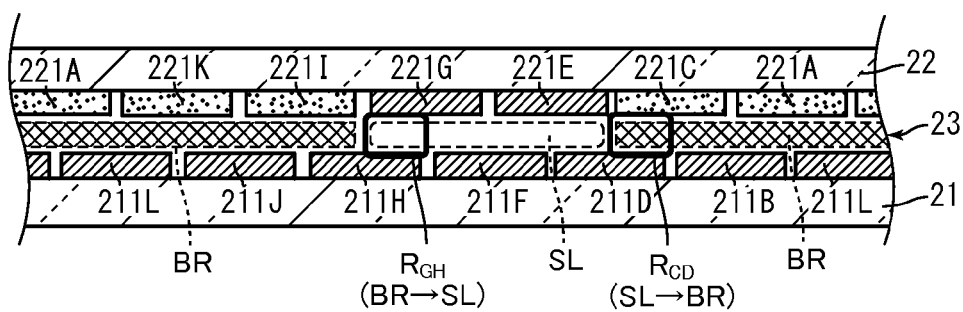
FIG. 19A is a schematic cross-sectional view of the switch liquid crystal panel showing another barrier creation state.
Figure 19B:
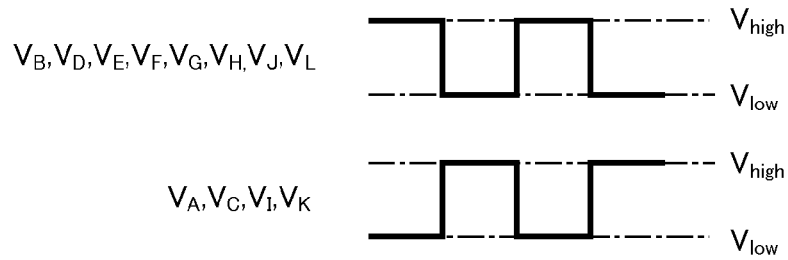
FIG. 19B is a waveform chart of signals $V_A$ to $V_L$ supplied to the electrodes to put the switch liquid crystal panel in the barrier creation state of FIG. 19A.

FIG. 19A is a schematic cross-sectional view of the switch liquid crystal panel 20 showing another barrier creation state. FIG. 19B is a waveform chart of signals $V_A$ to $V_L$ supplied to the electrodes to put the switch liquid crystal panel 20 in the barrier creation state of FIG. 19A.

In the example shown in FIGS. 19A and 19B, the control unit 40 applies a rectangular AC voltage to the electrodes, where a first phase is applied to the electrodes 221A, 221C, 221I and 221K included in the second electrode group 221 and a second phase is applied to the other electrodes (i.e. electrodes 221E and 221G and electrodes 211B to 211L).

Thus, barriers BR are created in the regions where the first electrode group overlaps the electrodes 221A, 221C, 221I and 221K in plan view and slits SL are created in the regions where the first electrode group overlaps the electrodes 221E and 221G in plan view.

Thus, according to the present embodiment, the positions of the barriers BR and slits SL can be moved more finely than on an inter-electrode distance BP basis. If the first and second electrode groups 211 and 221 are displaced from each other by a half of the inter-electrode distance BP in the x-direction as in FIG. 17, the positions of the barriers BR and slits SL can be moved a half of the inter-electrode distance BP at a time at regular intervals.

When the panel is switched from the barrier creation state of FIG. 18A to that of FIG. 19A, the barrier creation state of the region where the electrode 221C overlaps the electrode 211D in plan view (i.e. region $R_{CD}$) switches from a slit SL to a barrier BR. On the other hand, the barrier creation state of the region where the electrode 221G overlaps the electrode 211H in plan view (i.e. region $R_{GH}$) switches from a barrier BR to a slit SL.

According to the present embodiment, too, the time point at which the voltage applied to the liquid crystal layer 23 increases is delayed relative to the time point at which the voltage applied to the liquid crystal layer 23 decreases. More specifically, the time point at which the region $R_{CD}$ is switched from a slit SL to a barrier BR is delayed relative to the time point at which the region $R_{GH}$ is switched from a barrier BR to a slit SL. Further, the time by which a time point is delayed is adjusted depending on the position of the viewer 90.

FIG. 20 is a waveform chart showing how the signals $V_A$ to $V_L$ supplied to the electrodes as well as the voltage $|V_C-V_D|$ applied to the region $R_{CD}$ and the voltage $|V_G-V_H|$ applied to the region $R_{GH}$ change over time when the panel is switched between barrier creation states.

In the example shown in FIG. 20, a time point at which the signal $V_C$ is reversed to switch between barrier creation states is delayed by a delay time $\Delta t$ relative to a time point at which the signals $V_A$, $V_F$, $V_K$, $V_B$, $V_H$, $V_J$ and $V_L$ are reversed. Thus, the time point at which the voltage is applied to the region $R_{CD}$ is delayed by the delay time $\Delta t$ relative to the time point at which the voltage is removed from the region $R_{GH}$.

The present embodiment, too, decides on an appropriate delay time $\Delta t$ depending on the positional information about the viewer 90 to minimize the luminance variations produced when the panel is switched between barrier creation states.

Third Embodiment

The stereoscopic display device according to a third embodiment of the present invention is different from the stereoscopic display device 1 in how to drive the switch liquid crystal panel 20. In the present embodiment, the control unit 40 gradually changes the absolute value of the voltage applied to the liquid crystal layer 23 by the switch liquid crystal panel 20 to adjust the timing for switching between barrier creation states.

Figure 21:
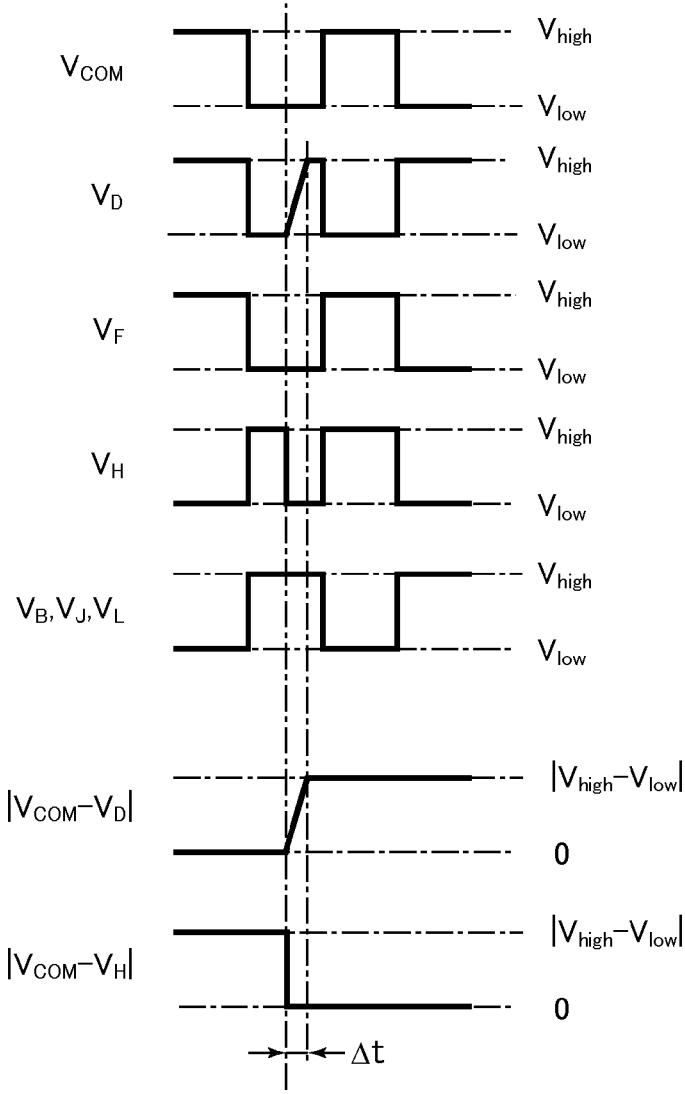
FIG. 21 is a waveform chart showing how the signals $V_{COM}$, $V_B$, $V_D$, $V_F$, $V_J$, $V_H$, and $V_L$ supplied to the electrodes as well as the voltage $|V_{COM}-V_D|$ applied to the region $R_D$ and the voltage $|V_{COM}-V_H|$ applied to the region $R_H$ change over time when the panel is switched between barrier creation states according to a third embodiment of the present invention.

FIG. 21 is a waveform chart showing how the signals $V_{COM}$, $V_B$, $V_D$, $V_F$, $V_J$, $V_H$, and $V_L$ supplied to the electrodes as well as the voltage $|V_{COM}-V_D|$ applied to the region $R_D$ and the voltage $|V_{COM}-V_H|$ applied to the region $R_H$ change over time when the panel is switched from the barrier creation state of FIG. 9A to that of FIG. 10A according to the present embodiment.

In the example shown in FIG. 21, the signal $V_D$ is gradually changed during the delay time $\Delta t$. Thus, the voltage applied to the region $R_D$ changes gradually. Thus, a time point at which the voltage is applied to the region $R_D$ is delayed by the delay time $\Delta t$ relative to a time point at which the voltage is removed from the region $R_H$.

The present embodiment, too, decides on an appropriate delay time $\Delta t$ depending on the positional information about the viewer 90 to minimize the luminance variations produced when the panel is switched between barrier creation states.

Fourth Embodiment

Figure 22:
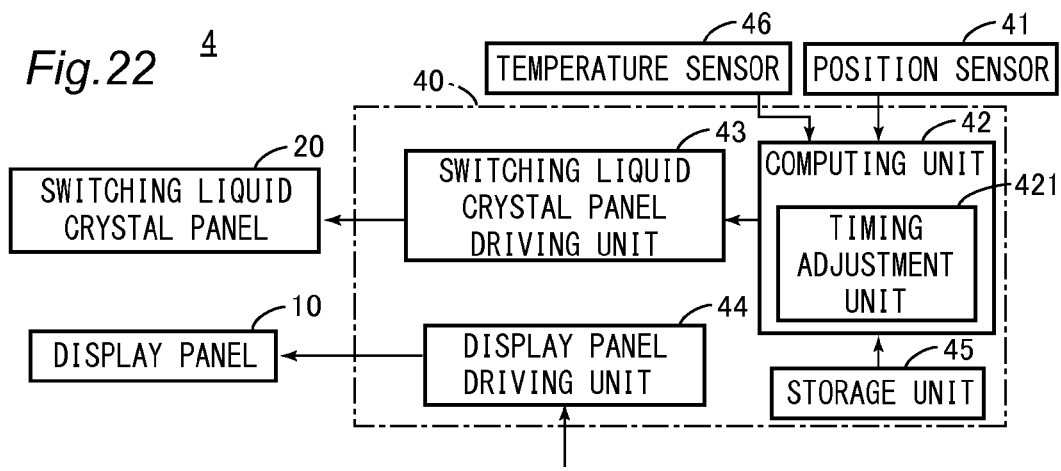
FIG. 22 is a functional block diagram of a stereoscopic display device according to a fourth embodiment of the present invention.

FIG. 22 is a functional block diagram of a stereoscopic display device 4 according to a fourth embodiment of the present invention. In addition to the components of the stereoscopic display device 1, the stereoscopic display device 4 includes a temperature sensor 46. The temperature sensor 46 measures the environmental temperature and supplies its value to the computing unit 42 of the control unit 40.

Figure 23:
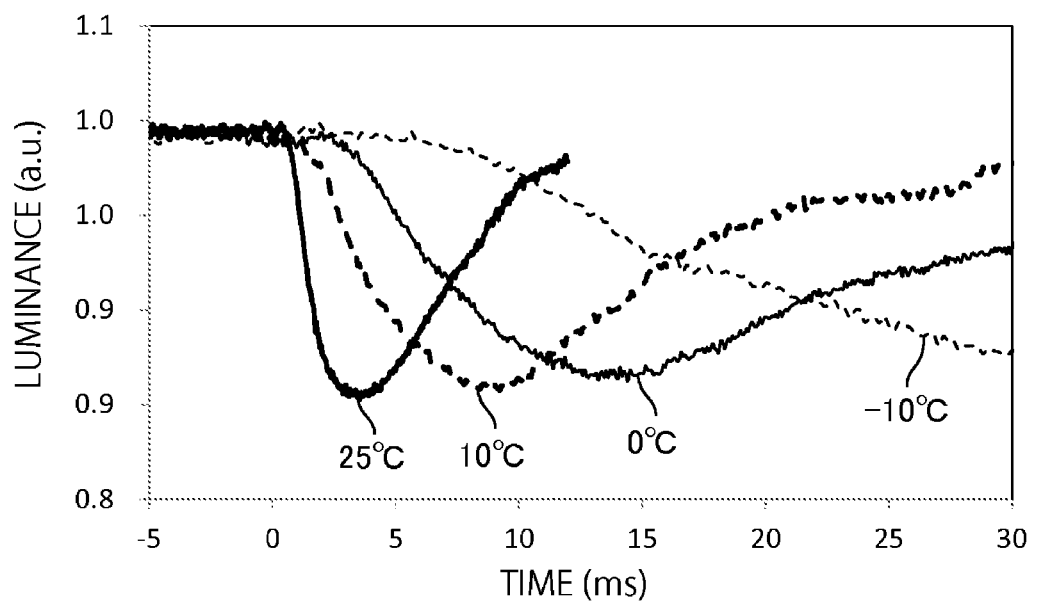
FIG. 23 is a graph showing how luminance changes over time when the panel is switched between barrier creation states for different environmental temperatures in connection with one example arrangement of the stereoscopic display device.

FIG. 23 is a graph showing how luminance changes over time when the panel is switched between barrier creation states for different environmental temperatures in connection with one example arrangement of the stereoscopic display device 4. As shown in FIG. 23, the behavior of the varying luminance produced when liquid crystal switches between barrier creation states significantly changes depending on the environmental temperature. Thus, even if a delay time $\Delta t$ is decided on that reduces luminance variations at a certain temperature, no effect may be produced at another temperature, or luminance variations may even increase.

In the present embodiment, the timing adjustment unit 421 adjusts the delay time $\Delta t$ depending on the value of environmental temperature supplied from the temperature sensor 46, in addition to the positional information supplied by the position sensor 41.

For example, the timing adjustment unit 421 converts the positional coordinates (x,y,z) of the viewer 90 to polar coordinates (r,θ,φ). The storage unit 45 stores a table $\Delta t(\theta, \phi, T)$ of display times $\Delta t$ that are dependent on the directional components θ and φ of polar coordinates and the environmental temperature T. The timing adjustment unit 421 refers to the storage unit 45 to decide on a delay time $\Delta t$.

Alternatively, the timing adjustment unit 421 may not refer to the storage unit 45, but may decide on a delay time $\Delta t$ as a function of the positional coordinates (x,y,z) and the environmental temperature T by calculation.

The present embodiment minimizes the luminance variations produced when the panel is switched between barrier creations states in a wide temperature range.

Other Embodiments

While embodiments of the present invention have been described, the present invention is not limited to the above embodiments, and various modifications may be made within the scope of the invention. Further, embodiments may be combined appropriately and carried out.

For example, a switch liquid crystal panel 20 including a second substrate 22 as in the stereoscopic display device 2 of the second embodiment may be driven in the manner of the third or fourth embodiment.

In each of the above embodiments, the switch liquid crystal panel 20 is located closer to a viewer than the display panel 10 is. Alternatively, the display panel 10 may be located closer to a viewer than the switch liquid crystal panel 20 is.

Each of the above embodiments describes an implementation where the display panel 10 is a liquid crystal display panel. Alternatively, an organic electro-luminescent (EL) panel, a micro-electro-mechanical system (MEMS) panel, or a plasma display panel may be used instead of a liquid crystal display panel.

INDUSTRIAL APPLICABILITY

The present invention is industrially useful as a stereoscopic display device.

The invention claimed is:

1. A stereoscopic display device comprising:
    a display panel that displays an image;
    a switch liquid crystal panel disposed to overlie the display panel and including a liquid crystal layer;
    a position sensor that obtains positional information about a viewer; and
    a control unit that receives the positional information from the position sensor and locally applies to the liquid crystal layer a first voltage for rendering the switch liquid crystal panel translucent and a second voltage for rendering the switch liquid crystal panel non-translucent to display a parallax barrier that depends on the positional information,
    wherein the control unit includes a timing adjustment unit that delays a time point for switching from the lower one of the first voltage and the second voltage to the higher one relative to a time point for switching from the higher one to the lower one by a delay time that depends on the positional information.

2. The stereoscopic display device according to claim 1, wherein the control unit further includes a storage unit storing a table for the delay time that depends on positional relationship between the viewer and the stereoscopic display device, and
    the timing adjustment unit refers to the table stored in the storage unit to decide the delay time.

3. The stereoscopic display device according to claim 1, wherein the control unit gradually changes an absolute value of at least one of voltages applied to the liquid crystal layer.

4. The stereoscopic display device according to claim 1, further comprising: a temperature sensor that obtains an environmental temperature value and supplies it to the control unit,
    wherein the timing adjustment unit decides the delay time depending on the temperature value.

5. The stereoscopic display device according to claim 1, wherein the switch liquid crystal panel further includes:
    a first substrate and a second substrate sandwiching the liquid crystal layer and having opposite faces;
    a first electrode group including a plurality of electrodes provided on the first substrate and arranged with a predetermined inter-electrode distance in an arrangement direction, the arrangement direction being an in-plane direction of the first substrate; and
    a second electrode group including a plurality of electrodes provided on the second substrate and arranged with the inter-electrode distance in the arrangement direction,
    wherein the first electrode group and the second electrode group are displaced from each other in the arrangement direction, and
    the control unit controls a potential of the plurality of electrodes included in the first electrode group and a potential of the plurality of electrodes included in the second electrode group to locally apply the first voltage and the second voltage to the liquid crystal layer.

6. The stereoscopic display device according to claim 5, wherein the control unit drives, with a first phase, at least one of the electrodes included in one electrode group selected from the first electrode group and the second electrode group and drives the other electrodes of the first electrode group and the second electrode group with a second phase depending on the positional information, the second phase being opposite in polarity to the first phase.

7. The stereoscopic display device according to claim 1, wherein the display panel is a liquid crystal display panel.

* * * * *